United States Patent
Lee et al.

(10) Patent No.: US 11,764,837 B2
(45) Date of Patent: Sep. 19, 2023

(54) METHOD FOR SETTING RECEPTION BEAM IN ELECTRONIC DEVICE, AND ELECTRONIC DEVICE

(71) Applicant: Samsung Electronics Co., Ltd., Suwon-si (KR)

(72) Inventors: Hyoungjoo Lee, Suwon-si (KR); Jinwoo Kim, Suwon-si (KR); Euichang Jung, Suwon-si (KR); Yonggue Han, Suwon-si (KR); Chaiman Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 17/525,085

(22) Filed: Nov. 12, 2021

(65) Prior Publication Data
US 2022/0149903 A1 May 12, 2022

Related U.S. Application Data

(63) Continuation of application No. PCT/KR2021/016362, filed on Nov. 10, 2021.

(30) Foreign Application Priority Data

Nov. 12, 2020 (KR) .................. 10-2020-0150966

(51) Int. Cl.
  *H04B 7/02* (2018.01)
  *H04B 7/0417* (2017.01)
  *H04B 7/0456* (2017.01)
(52) U.S. Cl.
  CPC ......... *H04B 7/0417* (2013.01); *H04B 7/0456* (2013.01)

(58) Field of Classification Search
  CPC ................... H04B 7/0417; H04B 7/0456
  (Continued)

(56) References Cited

U.S. PATENT DOCUMENTS

2006/0279460 A1 12/2006 Yun et al.
2016/0204507 A1* 7/2016 Karjalainen .......... H04W 84/20
                                                            342/372
(Continued)

FOREIGN PATENT DOCUMENTS

JP      2020-141204 A     9/2020
KR  10-2016-0086291 A    7/2016
(Continued)

OTHER PUBLICATIONS

Nawanit Kumar, Lean Beam Management for New Radio, LUP Student Papers, Lund University Libraries, EITM02 20201, Sep. 1, 2020.

(Continued)

*Primary Examiner* — Zewdu A Kassa
(74) *Attorney, Agent, or Firm* — Jefferson IP Law, LLP

(57) ABSTRACT

An electronic device is provided. The electronic device includes an antenna module, a memory, and a processor controlling to identify a first beam set among a plurality of beam sets stored in the memory, perform beamforming based on the identified first beam set through the antenna module, determine whether a beam pattern is changed, based on, at least, a prediction value of a reception signal strength set corresponding to the first beam set and a measurement value of a signal received through the antenna module, and change a setting related to a reception beam if the beam pattern is determined to be changed.

16 Claims, 24 Drawing Sheets

(58) Field of Classification Search
USPC ............... 375/267, 261, 259, 219, 295, 316
See application file for complete search history.

(56) References Cited

U.S. PATENT DOCUMENTS

| | | |
|---|---|---|
| 2017/0347358 A1 | 11/2017 | Raghavan et al. |
| 2018/0062717 A1 | 3/2018 | Mok et al. |
| 2019/0097712 A1 | 3/2019 | Singh et al. |
| 2019/0103906 A1* | 4/2019 | Athley ................ H04B 7/0695 |
| 2019/0280820 A1 | 9/2019 | Kim et al. |
| 2019/0319686 A1 | 10/2019 | Chen, IV et al. |
| 2019/0356368 A1 | 11/2019 | Liu et al. |
| 2020/0275287 A1 | 8/2020 | Kumagai |
| 2021/0083753 A1 | 3/2021 | Kim et al. |

FOREIGN PATENT DOCUMENTS

| | | |
|---|---|---|
| KR | 10-2017-0114914 A | 10/2017 |
| KR | 10-2017-0117859 A | 10/2017 |
| KR | 10-2018-0023515 A | 3/2018 |
| KR | 10-2019-0032470 A | 3/2019 |
| KR | 10-2019-0096241 A | 8/2019 |
| WO | 2015/183472 A1 | 12/2015 |
| WO | 2018/025070 A1 | 2/2018 |

OTHER PUBLICATIONS

International Search Report dated Feb. 21, 2022, issued in International Application No. PCT/KR2021/016362.

* cited by examiner

METHOD FOR SETTING RECEPTION BEAM IN ELECTRONIC DEVICE, AND ELECTRONIC DEVICE

CROSS-REFERENCE TO RELATED APPLICATION(S)

This application is a continuation application, claiming priority under § 365(c), of an International application No. PCT/KR2021/016362, filed on Nov. 10, 2021, which is based on and claims the benefit of a Korean patent application number 10-2020-0150966, filed on Nov. 12, 2020, in the Korean Intellectual Property Office, the disclosure of which is incorporated by reference herein in its entirety.

TECHNICAL FIELD

The disclosure relates to a method for setting a reception beam in an electronic device supporting beamforming and an electronic device.

BACKGROUND ART

In order to meet the demand for wireless data traffic soaring since the 4$^{th}$ generation (4G) communication system came to the market, there are ongoing efforts to develop enhanced 5$^{th}$ generation (5G) communication systems or pre-5G communication systems. For the reasons, the 5G communication system or pre-5G communication system is called the beyond 4G network communication system or post long term evolution (LTE) system.

For higher data transmit rates, 5G communication systems are considered to be implemented on a higher frequency band (e.g., a band ranging from 6 gigahertz (GHz) to 60 GHz, or a millimeter (mm) Wave band). To mitigate pathloss on the mmWave band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

For example, 5G wireless communication systems may use multiple antenna-based beamforming technology to overcome high signal attenuation upon transmission and reception of signals on an mmWave frequency band (e.g., above 6 GHz, frequency range (FR)2). Beamforming is a method to maximize the signal transmission/reception gain in the direction to be oriented by adjusting the phase per antenna.

Aspects of the disclosure are to address at least the above-mentioned problems and/or disadvantages and to provide at least the advantages described below. Accordingly, an aspect of the disclosure is to provide, in the 5G wireless communication system, an electronic device that may select an antenna module and/or a transmission/reception beam capable of optimal signal transmission/reception and transmit/receive data. To select a transmission beam or a reception beam of the electronic device, various parameters (e.g., a beam gain, a beam shape, and the number of beams) may be set. When fixed values are used for various parameters related to selection of the transmission beam or reception beam, the performance of beamforming may be degraded due to the user's influence or deviation between electronic devices.

Another aspect of the disclosure is to provide an electronic device that may enhance beamforming performance by determining whether a beam pattern changes and changing a reception beam setting to suit the changed pattern.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes an antenna module, a memory, and a processor controlling to identify a first beam set among a plurality of beam sets stored in the memory, perform beamforming based on the identified first beam set through the antenna module, determine whether a beam pattern is changed at least partially based on a prediction value of a reception signal strength set corresponding to the first beam set and a measurement value of a signal received through the antenna module, and change a setting related to a reception beam if the beam pattern is determined to be changed.

In accordance with another aspect of the disclosure, a method for setting a reception beam by an electronic device is provided. The method includes identifying a first beam set among a plurality of beam sets stored in a memory, performing beamforming based on the identified first beam set through the antenna module, determining whether a beam pattern is changed, at least partially based on a prediction value of a reception signal strength set corresponding to the first beam set and a measurement value of a signal received through the antenna module, and changing a setting of a reception beam if the beam pattern is determined to be changed.

Advantageous Effects

According to various embodiments, the electronic device may enhance beamforming performance by determining whether a beam pattern changes and changing a reception beam setting to suit the changed pattern.

According to various embodiments, it is possible to reduce performance degradation of a beam operation algorithm by determining whether a beam pattern is changed in the electronic device to change a beam set or adjusting a setting (or parameter) related to a beam change.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
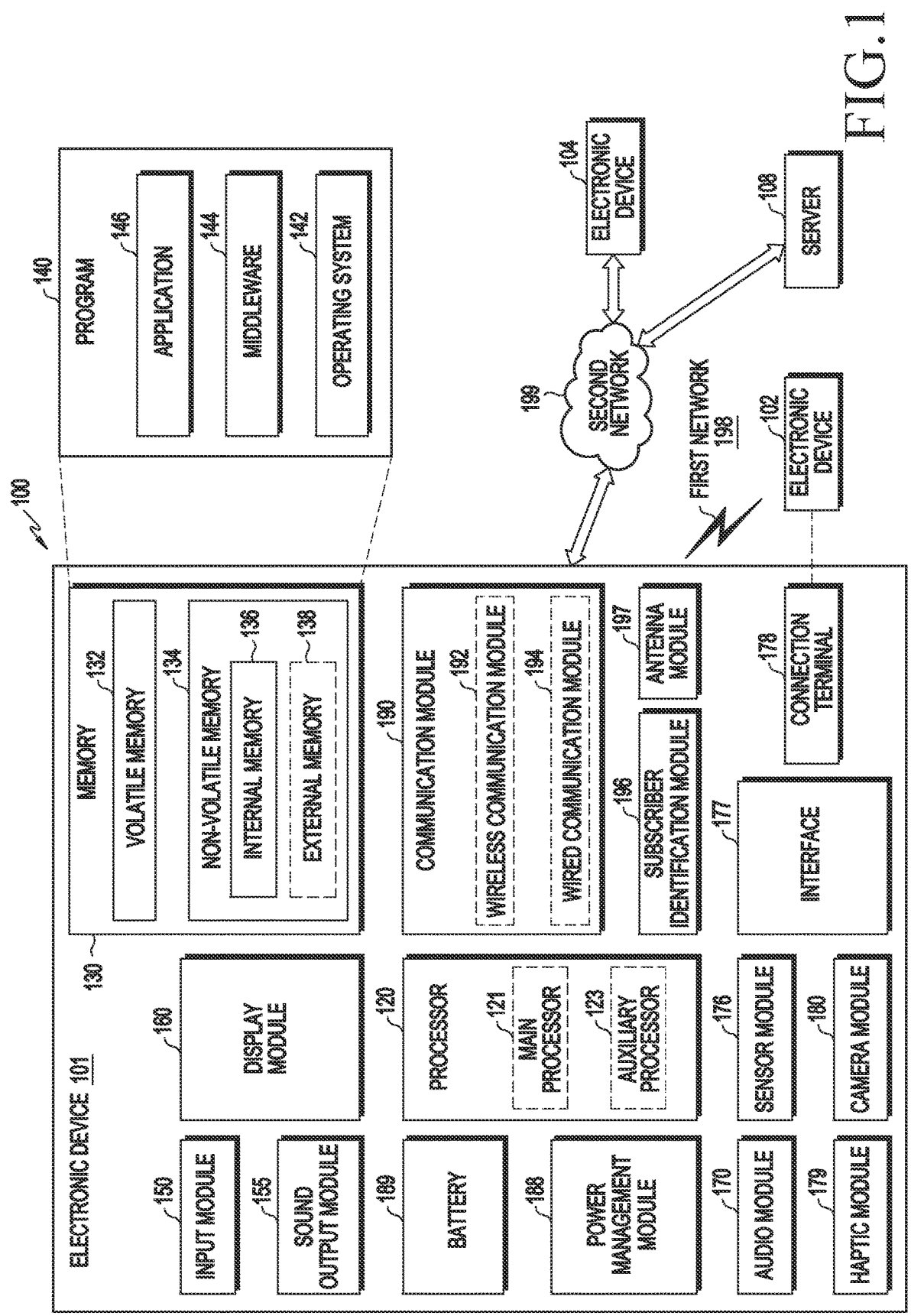
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 and external memory 138.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
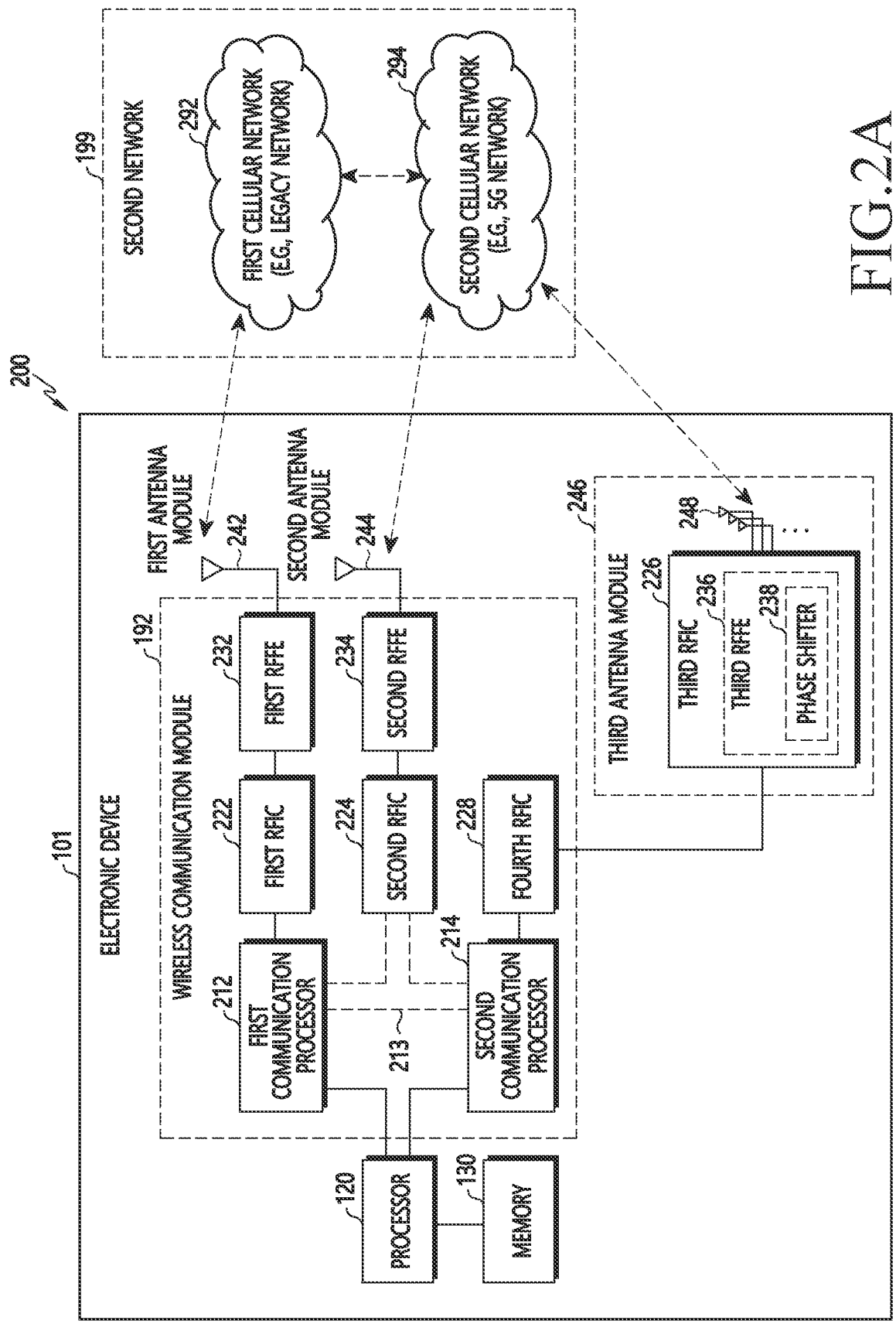
FIG. 2A is a block diagram illustrating an electronic device for supporting legacy network communication and 5G network communication according to an embodiment of the disclosure.
Figure 2B:
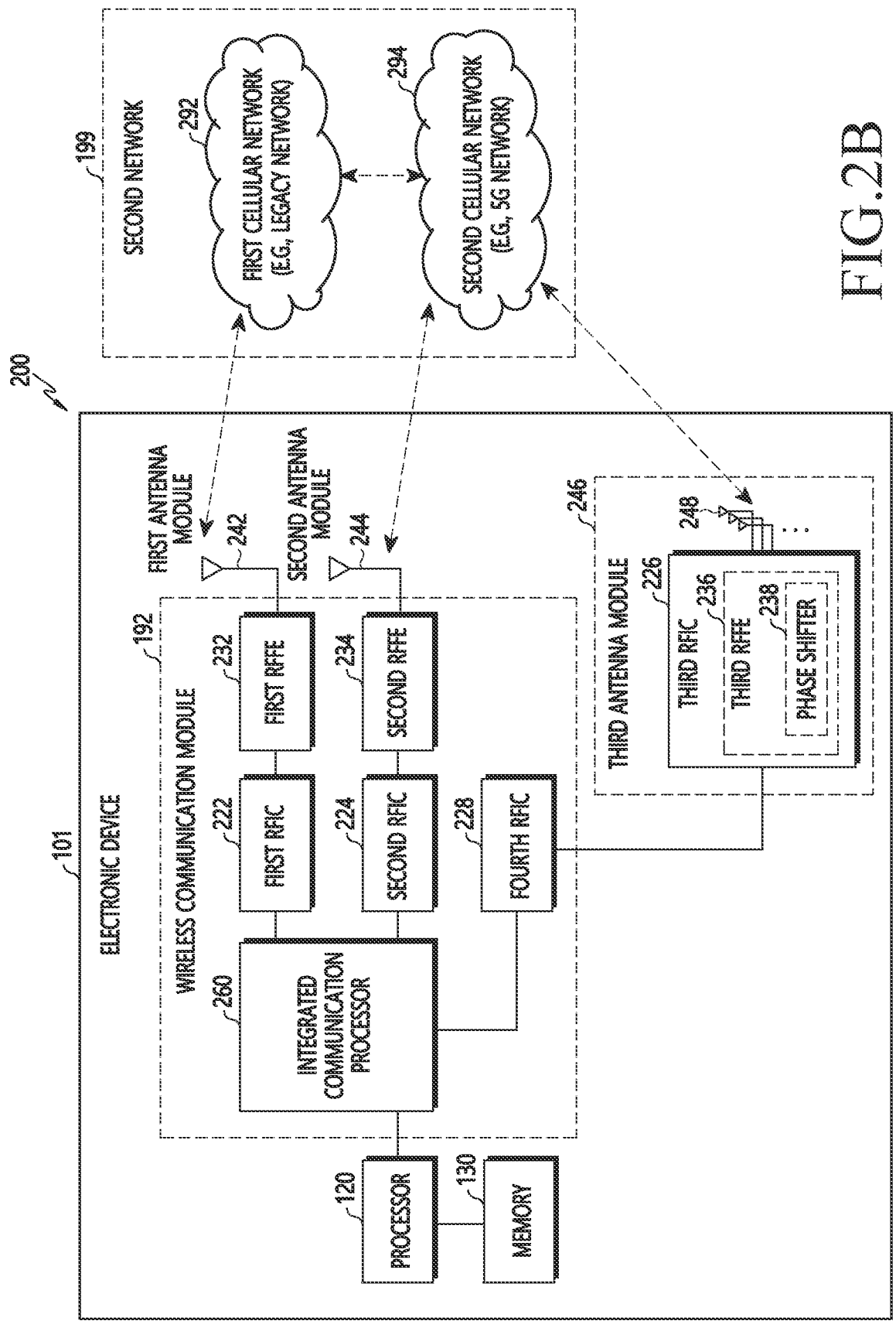
FIG. 2B is a block diagram illustrating an electronic device for supporting legacy network communication and 5G network communication according to an embodiment of the disclosure.

FIG. 2A is a block diagram 200 illustrating an electronic device 101 for supporting legacy network communication and 5G network communication according to an embodiment of the disclosure. FIG. 2B is a block diagram illustrating an electronic device for supporting legacy network communication and 5G network communication according to an embodiment of the disclosure.

Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to another embodiment, the electronic device 101 may further include at least one component among the components of FIG. 1, and the second network 199 may further include at least one other network. The first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel. The first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. The second cellular network 294 may be a 5G network defined by the 3rd generation partnership project (3GPP). Additionally, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

The first communication processor 212 and the second communication processor 214 may be implemented in a single chip or a single package. According to an embodiment, the first communication processor 212 or the second communication processor 214, along with the processor 120, an assistance processor 123, or communication module 190, may be formed in a single chip or single package.

Referring to FIG. 2B, an integrated communication processor 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. The third RFFE 236 may be formed as part of the third RFIC 226.

According to an embodiment of the disclosure, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment of the disclosure, the first RFIC 222 and the second RFIC 224 may be implemented as at least part of a single chip or single package. When the first RFIC 222 and the second RFIC 224 in FIG. 2A or FIG. 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. At least one of the first antenna module 242 or the second antenna module 244 may be omitted or be combined with another antenna module to process multi-band RF signals.

According to an embodiment of the disclosure, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment of the disclosure, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3:
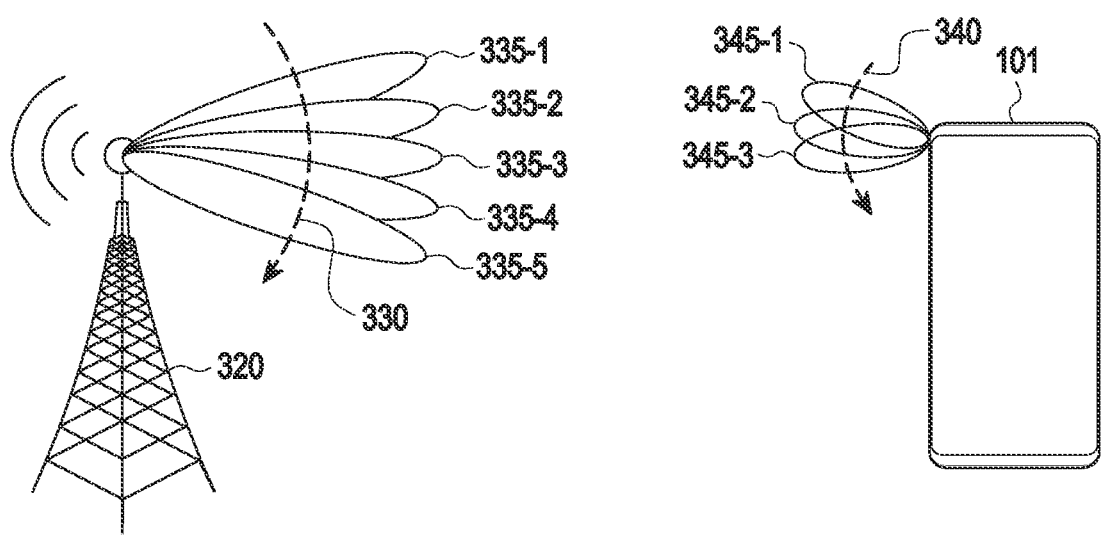
FIG. 3 is a view illustrating an operation for wireless communication connection between a base station and an electronic device according to an embodiment of the disclosure.

FIG. 3 is a view illustrating an operation for wireless communication connection between a base station and an electronic device according to an embodiment of the disclosure.

Referring to FIG. 3, an embodiment is illustrated of an operation for wireless communication connection between an electronic device 101 and a base station 320 in the second network 294 (e.g., a 5G network) of FIG. 2A or FIG. 2B, which uses directional beams for wireless communication. First, the base station (gNodeB (gNB), transmission reception point (TRP)) 320 may perform beam detection with the electronic device 101 for the wireless communication connection. In the embodiment illustrated in FIG. 3, for beam detection, the base station 320 may sequentially send out a plurality of transmission beams, e.g., a first to fifth transmission beam 335-1 to 335-5 with different directions, thereby performing transmission beam sweeping 330 at least once.

The first to fifth transmission beams 335-1 to 335-5 may include at least one synchronization signal block (SSB) (e.g., synchronization sequence/physical broadcast channel (SS/PBCH) block). The SS/PBCH block may be used to periodically measure the channel or beam strength of the electronic device 101.

According to another embodiment of the disclosure, the first to fifth transmission beams 335-1 to 335-5 may include at least one channel state information-reference signal (CSI-RS). The CSI-RS is a reference signal that the base station 320 may flexibly configure and may be periodically/semi-persistently or aperiodically transmitted. The electronic device 101 may measure the channel and beam strength using the CSI-RS.

The transmission beams may form a radiation pattern with a selected beam width. For example, the transmission beams may have a broad radiation pattern with a first beam width and a sharp radiation pattern with a second beam width narrower than the first beam width. Transmission beams including the SS/PBCH block may have a broader radiation pattern than transmission beams including the CSI-RS.

The electronic device 101 may perform reception beam sweeping 340 while the base station performs transmission beam sweeping 330. For example, while the base station 320 performs first transmission beam sweeping 330, the electronic device 101 may fix a first reception beam 345-1 (of first through third reception beams 345-1, 345-2, and 345-3) to a first direction and receive the SS/PBCH block signal transmitted from at least one of the first to fifth transmission beams 335-1 to 335-5. While the base station 320 performs second transmission beam sweeping 330, the electronic device 101 may fix a second reception beam 345-2 to a second direction and receive the SS/PBCH block signals transmitted from the first to fifth transmission beams 335-1 to 335-5. As such, the electronic device 101 may select a communicable reception beam (e.g., the second reception beam 345-2) and transmission beam (e.g., the third transmission beam 335-3) based on the result of signal reception operation via the reception beam sweeping 340. The selected communicable reception beam (e.g., the second reception beam 345-2) and transmission beam (e.g., the third transmission beam 335-3) may be referred to as a beam pair.

As such, after communicable transmission/reception beams are determined, the base station 320 and the electronic device 101 may transmit and/or receive basic information for cell configuration and configure information for additional beam operation based thereupon. For example, the beam operation information may include detailed information about the configured beam and setting information about SS/PBCH block, CSI-RS or additional reference signals.

Further, the electronic device 101 may continuously monitor the channel and beam strength using at least one of the SS/PBCH block and CSI-RS included in the transmission beam. The electronic device 101 may adaptively select the beam with good beam quality using the monitoring operation. Optionally, the electronic device 101 may reperform the beam sweeping operation to determine communicable beams if the electronic device 101 moves or beam is blocked so that the communication connection is released.

Figure 4:
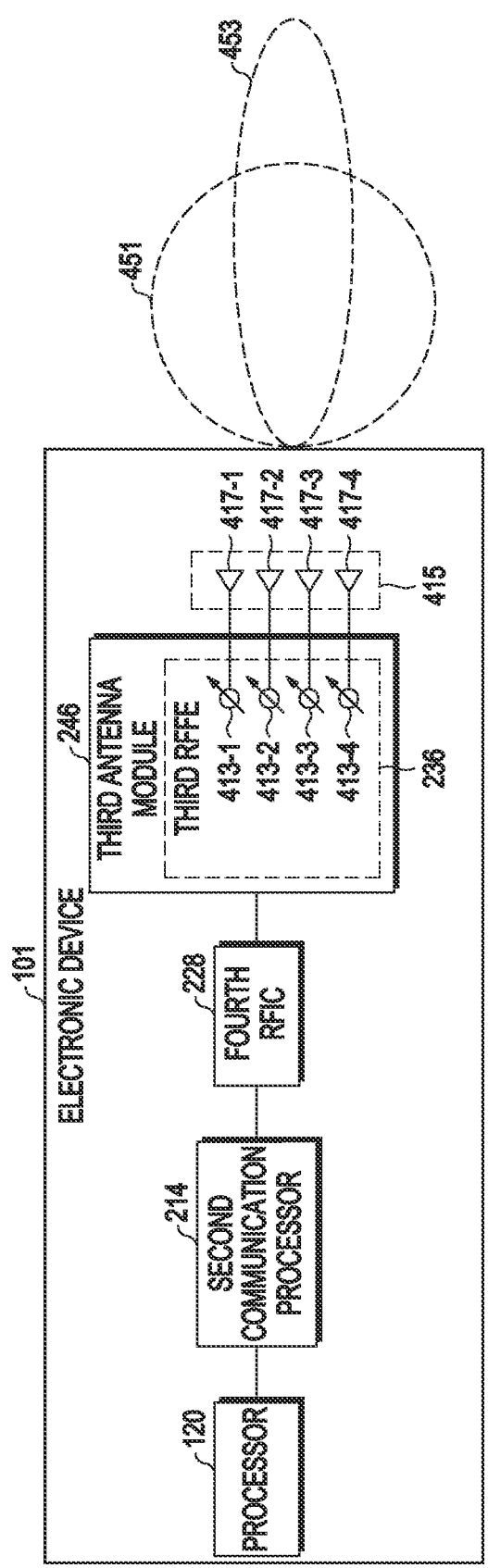
FIG. 4 is a block diagram illustrating an electronic device performing beamforming according to an embodiment of the disclosure.

FIG. 4 is a block diagram illustrating an electronic device 101 for 5G network communication according to an embodiment of the disclosure.

Referring to FIG. 4, the electronic device 101 may include various components as shown in FIG. 2A or FIG. 2B. However, for simplicity, FIG. 4 illustrates that the electronic device 101 includes a processor 120, a second communication processor 214, a fourth RFIC 228, and at least one third antenna module 246.

In the embodiment illustrated in FIG. 4, the third antenna module 246 may include a first to fourth phase shifter 413-1 to 413-4 (e.g., the phase shifter 238 of FIGS. 2A and 2B) and/or a first to fourth antenna element 417-1 to 417-4 (e.g., the antenna 248 of FIG. 2A or FIG. 2B). Each of the first to fourth antenna elements 41701 to 417-4 may be electrically connected to an individual one of the first to fourth phase shifters 413-1 to 413-4. The first to fourth antenna elements 417-1 to 417-4 may form at least one antenna array 415.

The second communication processor 214 may control the first to fourth phase shifters 413-1 to 413-4, controlling the phase of the signals transmitted and/or received via the first to fourth antenna elements 41701 to 417-4 and thus generating a transmission beam and/or reception beam in a selected direction.

According to an embodiment of the disclosure, the third antenna module 246 may form a beam 451 with a broad radiation pattern (hereinafter, a "broad beam") and a beam 453 with a sharp, or narrow, radiation pattern (hereinafter, a "sharp beam") as mentioned above, depending on the number of the antenna elements used. For example, if the third antenna module 246 uses all of the first to fourth antenna elements 417-1 to 417-4, the third antenna module 246 may form the sharp beam 452 and, if using only the first antenna module 417-1 and the second antenna element 417-2, the third antenna module 246 may form the broad beam 451. The broad beam 451 has broader coverage than the sharp beam 452 but has a smaller antenna gain and may thus be more effective in beam discovery. In contrast, the sharp beam 452 has narrower coverage than the broad beam 451 but has a larger antenna gain and may thus enhance communication performance.

According to an embodiment of the disclosure, the second communication processor 214 may use the sensor module 176 (e.g., a nine-axis sensor, grip sensor, or GPS) in beam discovery. For example, the electronic device 101 may adjust the beam discovery position and/or beam discovery period based on the position and/or movement of the electronic device 101 using the sensor module 176. As another example, if the electronic device 101 is gripped by the user, the electronic device 101 may grasp the gripped portion of the user using a grip sensor, thereby selecting an antenna module with relatively better communication performance from among the plurality of third antenna modules 246.

Figure 5:
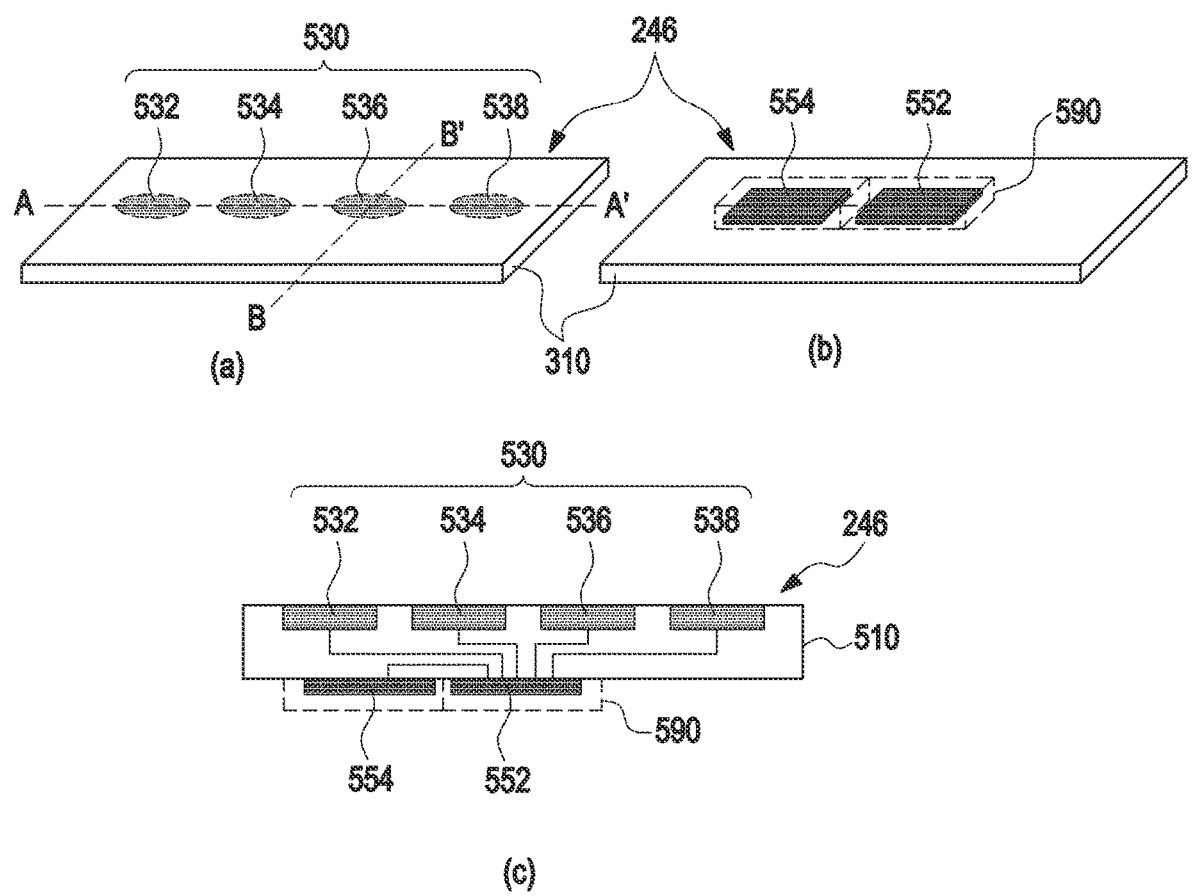
FIG. 5 is a view illustrating a structure of an antenna module according to an embodiment of the disclosure.

FIG. 5 illustrates an embodiment of a structure of a third antenna module described above in connection with FIGS. 2A and 2B according to an embodiment of the disclosure.

Referring to FIG. 5, part (a) of FIG. 5 is a perspective view of the third antenna module 246 as viewed from one side, and part (b) of FIG. 5 is a perspective view of the third antenna module 246 as viewed from another side. Part (c) of FIG. 5 is a cross-sectional view of the third antenna module 246 taken along line A-A'.

Referring to FIG. 5, the third antenna module 246 may include a printed circuit board 510, an antenna array 530, a radio frequency integrated circuit (RFIC) 552, and a power management integrated circuit (PMIC) 554. Optionally, the third antenna module 246 may further include a shielding member 590. Tt least one of the above-mentioned components may be omitted, or at least two of the components may be integrally formed with each other.

The printed circuit board 510 may include a plurality of conductive layers and a plurality of non-conductive layers alternately stacked with the conductive layers. Electronic components arranged on, or outside of, the printed circuit board 510 may be electrically connected together via wires and conductive vias formed on or through the conductive layers.

The antenna array 530 (e.g., 248 of FIGS. 2A and 2B) may include a plurality of antenna elements 532, 534, 536, or 538 arranged to form directional beams. The antenna elements may be formed on a first surface of the printed circuit board 510 as shown. According to another embodiment of the disclosure, the antenna array 530 may be formed inside the printed circuit board 510. The antenna array 530 may include a plurality of antenna arrays (e.g., a dipole antenna array and/or a patch antenna array) of the same or different shapes or kinds.

The RFIC 552 (e.g., 226 of FIGS. 2A and 2B) may be disposed in another area (e.g., a second surface opposite to the first surface) of the printed circuit board 510 which is spaced apart from the antenna array. The RFIC 552 may be configured to be able to process signals of a selected frequency band which are transmitted or received via the antenna array 530. Upon transmission, the RFIC 552 may convert a baseband signal obtained from a communication processor (e.g., the second communication processor 214) into a designated band of RF signal. Upon receipt, the RFIC 552 may convert the RF signal received via the antenna array 552 into a baseband signal and transfer the baseband signal to the communication processor.

According to another embodiment of the disclosure, upon transmission, the RFIC 552 may up-convert an IF signal (e.g., ranging from about 9 GHz to about 11 GHz) obtained from the intermediate frequency integrated circuit (IFIC) (e.g., the fourth RFIC 228 of FIGS. 2A and 2B) into a selected band of RF signal. Upon receipt, the RFIC 552 may down-convert the RF signal obtained via the antenna array 552 into an IF signal and transfer the IF signal to the IFIC (e.g., the fourth RFIC 228 of FIGS. 2A and 2B).

The PMIC 554 may be disposed in another portion (e.g., the second surface) of the printed circuit board 510 which is spaced apart from the antenna array. The PMIC may receive a voltage from the main PCB (not shown) and provide necessary power to various components (e.g., the RFIC 552) on the antenna module.

The shielding member 590 may be disposed in a portion (e.g., the second surface) of the printed circuit board 510 to electromagnetically shield off at least one of the RFIC 552 or the PMIC 554. The shielding member 590 may include a shield can.

Although not shown, the third antenna module 246 may be electrically connected with another printed circuit board (e.g., the main printed circuit board) via the module interface. The module interface may include a connecting member, e.g., a coaxial cable connector, board-to-board connector, interposer, or flexible printed circuit board (FPCB). The RFIC 552 and/or the PMIC 554 may be electrically connected with the printed circuit board via the connecting member.

Figure 6:
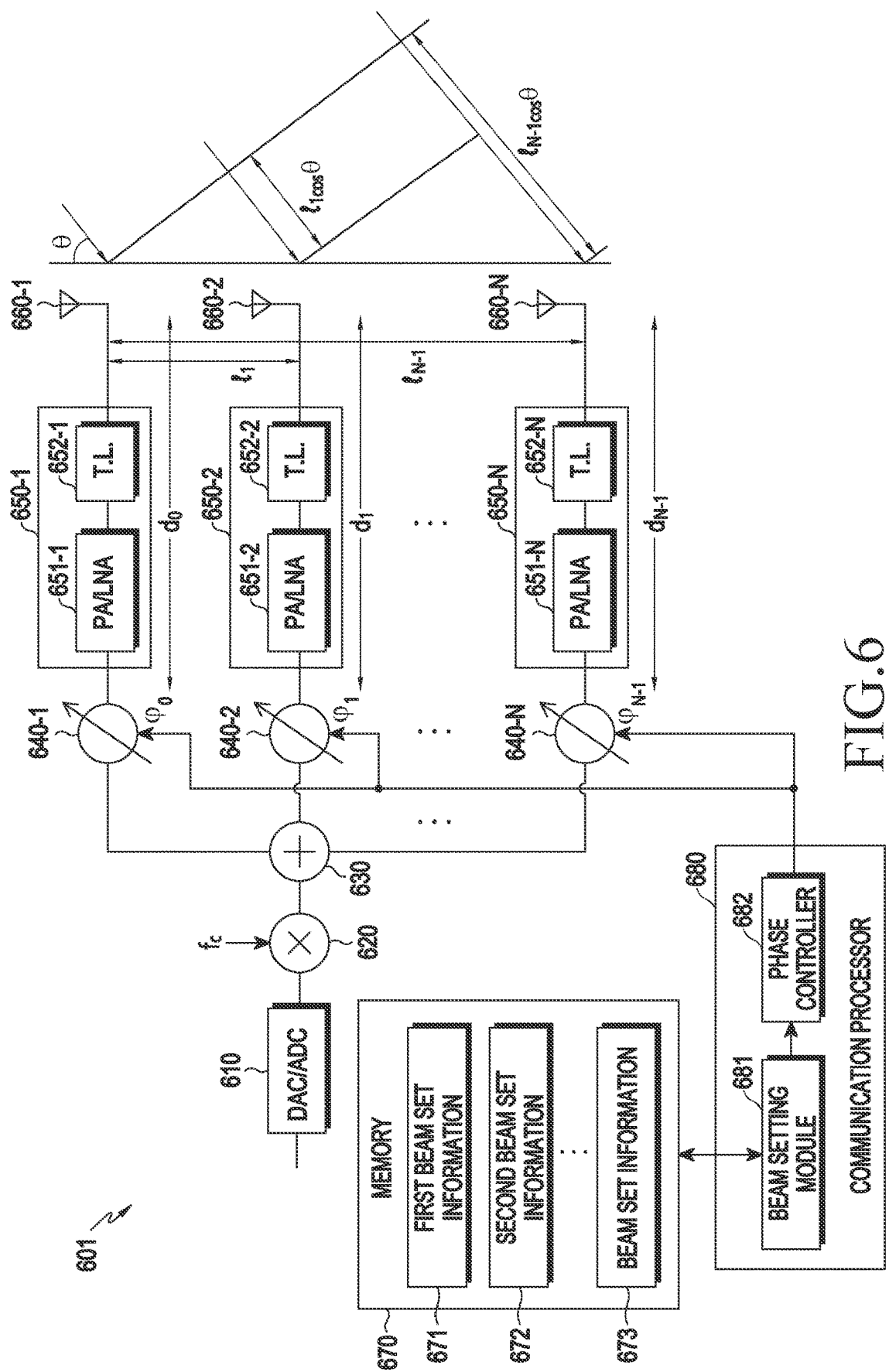
FIG. 6 is a view illustrating a structure of an antenna module for generating a reception beam in an electronic device, according to an embodiment of the disclosure.

FIG. 6 is a view illustrating a structure of an antenna module for generating a reception beam in an electronic device, according to an embodiment of the disclosure. According to various embodiments, FIG. 6 may be used identically or similarly to generate a transmit beam as well as a reception beam.

Referring to FIG. 6, an electronic device 601 (e.g., the electronic device 101) may include a digital-to-analog converter (DAC)/analog-to-digital converter (ADC) 610, a mixer 620, a combiner/divider 630, phase shifters 640-1 to 640-N, reception signal processing circuits 650-1 to 650-N, antenna elements 660-1 to 660-N, a memory 670, or a communication processor 680. The communication processor 680 may include a beam setting module 681 or a phase controller 682. Although the memory 670 is shown as a separate component from the communication processor 680 in FIG. 6, the memory 670 may be included in the communication processor 680 or in the same package as the communication processor 680.

The phase controller 682 may be included in the processor 120 or the second communication processor 214 of FIG. 4. The DAC/ADC 610 may be included in the second communication processor 214 or fourth RFIC 228 of FIG. 4. The mixer 620 may be included in the fourth RFIC 228, and the combiner/divider 630 may be included in the fourth RFIC 228, and the combiner/divider 630 may be included in the fourth RFIC 228 or the third antenna module 246. The phase shifters 640-1 to 640-N and the reception signal processing circuits 650-1 to 650-N may be included in the third antenna module 246. The phase shifters 640-1 to 640-N may correspond to the phase shifters 413-1 to 413-4 of FIG. 4, and the antenna elements 660-1 to 660-N may correspond to the antenna elements 417-1 to 417-4 of FIG. 4.

The transmission (Tx) signal (e.g., an uplink signal) transmitted from the electronic device to the base station may be converted from a digital signal to analog signal via the DAC/ADC 610 and be mixed with a carrier frequency ($f_c$) and frequency-modulated by the mixer 620. The transmission signal modulated with the carrier frequency may be distributed in the number (e.g., N) of the antenna elements 660-1 to 660-N via the combiner/divider 630.

The transmission signal distributed via the combiner/divider 630 may be signal-processed and transmitted along the transmission path for each antenna element. For example, the signal to be transmitted to a first antenna element 660-1 may be phase-shifted via the first phase shifter 640-1 from the signal distributed by the combiner/divider 630, transmission signal-processed via a first transmission/reception signal processing circuit 650-1, and then transmission-processed via the first antenna element 660-1. The first transmission/reception signal processing circuit 650-1 may include a power amplifier (PA)/low noise amplifier (LNA) 651-1 and a transmission line (TL) 652-1. The signal phase-shifted via the first phase shifter 640-1 may be amplified into a preset magnitude of signal via the power amplifier (PA)/low noise amplifier (LNA) 651-1 and may then be transmitted to the first antenna element 660-1 via the TL 652-1.

The signal to be transmitted to the second antenna element 660-2 may be phase-shifted from the signal distributed by the combiner/divider 630 through the second phase shifter 640-2 and subjected to transmission signal processing through the second transmission/reception signal processing circuit 650-2 and then transmitted through the second antenna element 660-2. The second transmission/reception signal processing circuit 650-2 may include a power amplifier (PA)/low noise amplifier (LNA) 651-2 and a transmission line (TL) 652-2. The signal phase-shifted via the second phase shifter 640-2 may be amplified into a preset magnitude of signal via the power amplifier (PA)/low noise amplifier (LNA) 651-2 and may then be transmitted to the second antenna element 660-2 via the TL 652-2.

The signal to be transmitted to an Nth antenna element 660-N may be phase-shifted via the Nth phase shifter 640-N from the signal distributed by the combiner/divider 630, transmission signal-processed via an Nth transmission/reception signal processing circuit 650-N, and then transmission-processed via the Nth antenna element 660-N. The Nth transmission/reception signal processing circuit 650-N may include a power amplifier (PA)/low noise amplifier (LNA) 651-N and a transmission line (TL) 652-N. The signal phase-shifted via the Nth phase shifter 640-N may be amplified into a preset magnitude of signal via the power amplifier (PA)/low noise amplifier (LNA) 651-N and may then be transmitted to the Nth antenna element 660-N via the TL 652-N.

The first phase shifter 640-1 to the Nth phase shifter 640-N each may receive a phase shift-related signal from the phase controller 690 and convert the signal distributed by the combiner/divider 630 into a different phase value depending on the received control signal. The first phase shifter 640-1 to the Nth phase shifter 640-N may adjust the per-antenna element phase of the signals transmitted to the antenna elements 660-1 to 660-N, thereby maximizing the signal transmission/reception gain in the direction to be oriented.

5G wireless communication systems may use multiple antenna-based beamforming technology to overcome high signal attenuation upon transmission and reception of signals on an mmWave frequency band (e.g., above 6 GHz) as shown in FIG. 6. The beamforming technology may maximize the signal transmission/reception gain in the direction to be oriented, by adjusting the phase per antenna element 660-1 to 660-N. The electronic device may dynamically select the optimal beam depending on the current wireless channel context via beam management upon signal transmission/reception with a base station and use it for beamforming.

Beam set information 673, (e.g., first beam set information 671 and second beam set information 672) may be stored in the memory 670. Although two pieces of beam set information are shown in FIG. 6, three or more pieces of beam set information may further be included. For example, each piece of beam set information among the beam set information may be stored in the form of a table as shown in Table 1 below.

TABLE 1

| beam id | $\varphi 0\ [°]$ | $\varphi 1\ [°]$ | ... | $\varphi N - 1\ [°]$ |
|---|---|---|---|---|
| 0 | $\varphi 0(0)$ | $\varphi 1(0)$ | ... | $\varphi N - 1(0)$ |
| 1 | $\varphi 0(1)$ | $\varphi 1(1)$ | ... | $\varphi N - 1(1)$ |
| ... | | | | |
| M - 1 | $\varphi 0(M-1)$ | $\varphi 1(M-1)$ | ... | $\varphi N - 1(M-1)$ |

Referring to Table 1, each beam set information may include information regarding a plurality of reception beams (e.g., M reception beams). For example, each beam set information may include a beam identifier (beam id) for each reception beam of the plurality of reception beams and phase setting values for each of the plurality of phase shifters (e.g., N phase shifters).

The first beam set information 671 and the second beam set information 672 may be configured in the same or similar form as in Table 1, and the phase setting values in the respective beam set information may be different from each other. The beam set information may be referred to as a beam book or a code book. The first beam set information 671 may include a first setting value corresponding to beamforming in a first state (e.g., a state in which the electronic device 601 is not put in a case) related to the electronic device 601, and the second beam set information 672 may include a second setting value corresponding to a second state related to the electronic device 601 (e.g., a state in which the electronic device 601 is put in a case, a state in which the user grips the electronic device 601 in her hand, or a state in which an abnormality occurs in the antenna included in the electronic device 601).

The first setting value may correspond to a measurement value identified via an inspection or verification executed by performing beamforming based on the first beam set information 671 before the electronic device 601 is released or a default setting value generated based on the measurement value. The second setting value may correspond to a measurement value identified by performing beamforming based on the second beam set information 672 or a setting value generated based on the measurement value. The first setting value and/or the second setting value may be changed based on a new measurement value according to the use of the electronic device 601.

The beam setting module 681 of the communication processor 680 may control the phase controller 682 to perform beamforming based on the first beam set information 671. The first beam set information 671 may correspond to beam set information (e.g., default beam set information) that is set as default or initially for the electronic device 101 among beam set information. The phase controller 682 may receive a control signal or control data for controlling each of the phase shifters 640-1 to 640-N from the beam setting module 681 and control the respective phase values of the phase shifters 640-1 to 640-N based on the received control signal or control data to receive or transmit data by a reception beam or a transmission beam of a set shape.

The beam setting module 681 of the communication processor 680 may determine whether the beam pattern of the electronic device 601 is changed (or whether the state related to the electronic device 601 is changed) based on at least part of the measurement value (e.g., the value measured for the signal received through the antenna elements 660-1 to 660-N) measured by the beamforming performed based on the first beam set information 671 and the second setting value included in the second beam set information 672. The beam pattern may include at least one of a beam direction, a beam width, a gain, a beam shape (e.g., beam distortion), and the number of beams (e.g., the number of side lobes) for each reception beam) or whether to adjust the phase.

As a result of the determination, if it is determined that the beam pattern is changed (or that the state related to the electronic device 601 is changed), the beam setting module 681 may change the setting of the reception beam and may update the beam setting information 673 stored in the memory 673 according to the changed setting. For example, as a method for changing the setting of the reception beam, the beam setting module 681 may change the beam set (e.g., change from a first beam set to a second beam set) or adjust at least one piece of setting information (or parameter) related to a change in the reception beam to be applied to the corresponding beam set. The beam setting information 673 may include, e.g., beam set information currently used or setting information (or parameters) related to a change in the reception beam to be applied to each beam set.

If it is determined that the beam pattern is changed (or if it is determined that the state related to the electronic device 601 is changed from the first state to the second state), the beam setting module 681 may change the beam set, which is to be used among the plurality of pieces of beam set information, from the first beam set to the second beam set and set the changed second beam set as the beam set to be currently used in the beam set information 673. As the beam set to be used is changed to the second beam set, the electronic device 601 may perform beamforming based on the second beam set information 672.

If it is determined that the beam pattern is changed (or if it is determined that the state related to the electronic device 601 is changed), the beam setting module 681 may adjust at least one piece of setting information (or parameter) related to the change in the reception beam (e.g., number of beams, number of antenna modules, beam gain, beam set structure, beam change threshold, beam change count, module monitoring threshold, module change threshold, module change count, or context change threshold). Specific embodiments of determining a change in beam pattern (or determining a change in the state related to an electronic device) in the beam setting module 681 and specific embodiments of changing a setting of a reception beam are described below in detail with reference to FIGS. 9 to 12.

Figure 7:
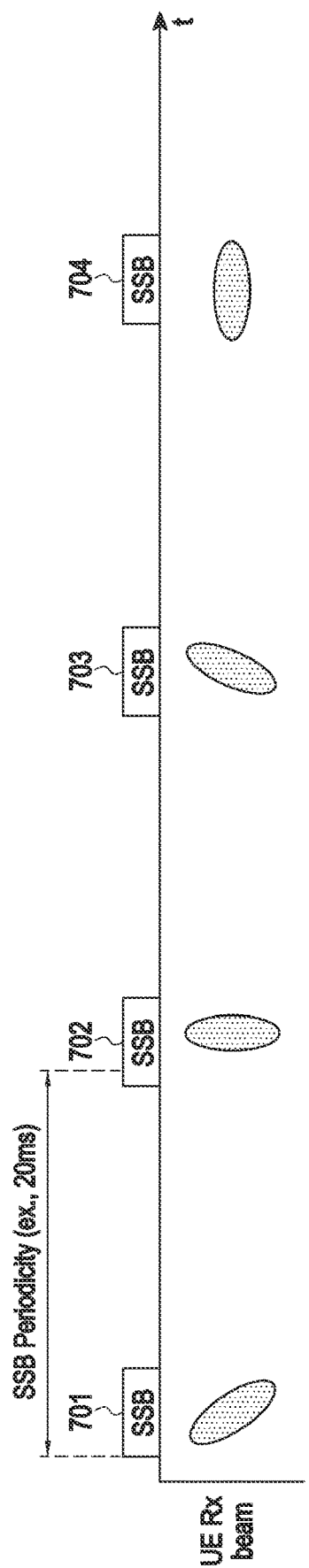
FIG. 7 is a view illustrating a method for selecting a reception beam in an electronic device according to an embodiment of the disclosure.

FIG. 7 is a view illustrating a method for selecting a reception beam in an electronic device (e.g., the electronic device 101 of FIG. 1) according to an embodiment of the disclosure.

Referring to FIG. 7, a base station may periodically transmit a reference signal (e.g., an SSB). The base station may transmit at least one SSB within a 5 ms period every 20 ms. The number of times or symbol length of SSB transmission within the 5 ms period may be set to differ according to frequency bands and/or subcarrier spacings (SCS).

The base station may sequentially transmit SSBs through a plurality of transmission beams (e.g., 64 transmission beams) having different transmission directions in a first SS/PBCH block(s) (hereinafter, SSB) transmission period 701 (e.g., an SSB measurement time configuration (SMTC) duration). In the first SSB transmission period 701, the electronic device may sequentially receive the SSBs transmitted through the plurality of transmission beams (e.g., 64 transmission beams) having different transmission directions through the first reception beam of the electronic device. The base station may sequentially transmit the SSBs through a plurality of transmission beams (e.g., 64 transmission beams) having different transmission directions in a second SSB transmission period 702. In the second SSB transmission period 702, the electronic device may sequentially receive the SSBs transmitted through the plurality of transmission beams (e.g., 64 transmission beams) having different transmission directions through the second reception beam of the electronic device. The base station may sequentially transmit the SSBs through a plurality of transmission beams (e.g., 64 transmission beams) having different transmission directions in a third SSB transmission period 703. In the third SSB transmission period 703, the electronic device may sequentially receive the SSBs transmitted through the plurality of transmission beams (e.g., 64 transmission beams) having different transmission directions through the third reception beam of the electronic device. The base station may sequentially transmit the SSBs through a plurality of transmission beams (e.g., 64 transmission beams) having different transmission directions in a fourth SSB transmission period 704. In the fourth SSB transmission period 704, the electronic device may sequentially receive the SSBs transmitted through the plurality of transmission beams (e.g., 64 transmission beams) having different transmission directions through the fourth reception beam of the electronic device. Although it is described with reference to FIG. 7 that the electronic device receives the SSBs, transmitted through a plurality of transmission beams, using four reception beams, the number of reception beams configurable in the electronic device is not limited to the above-mentioned number but may be set to other various values.

The electronic device (e.g., the electronic device 101) may measure reception signal strengths for each combination of the transmission beams (e.g., 64 transmission beams) of the base station and the reception beams (e.g., 10 reception beams) of the electronic device and set a combination having the largest reception signal strength in the current state as a beam pair to be used for current data transmission/reception.

Figure 8:
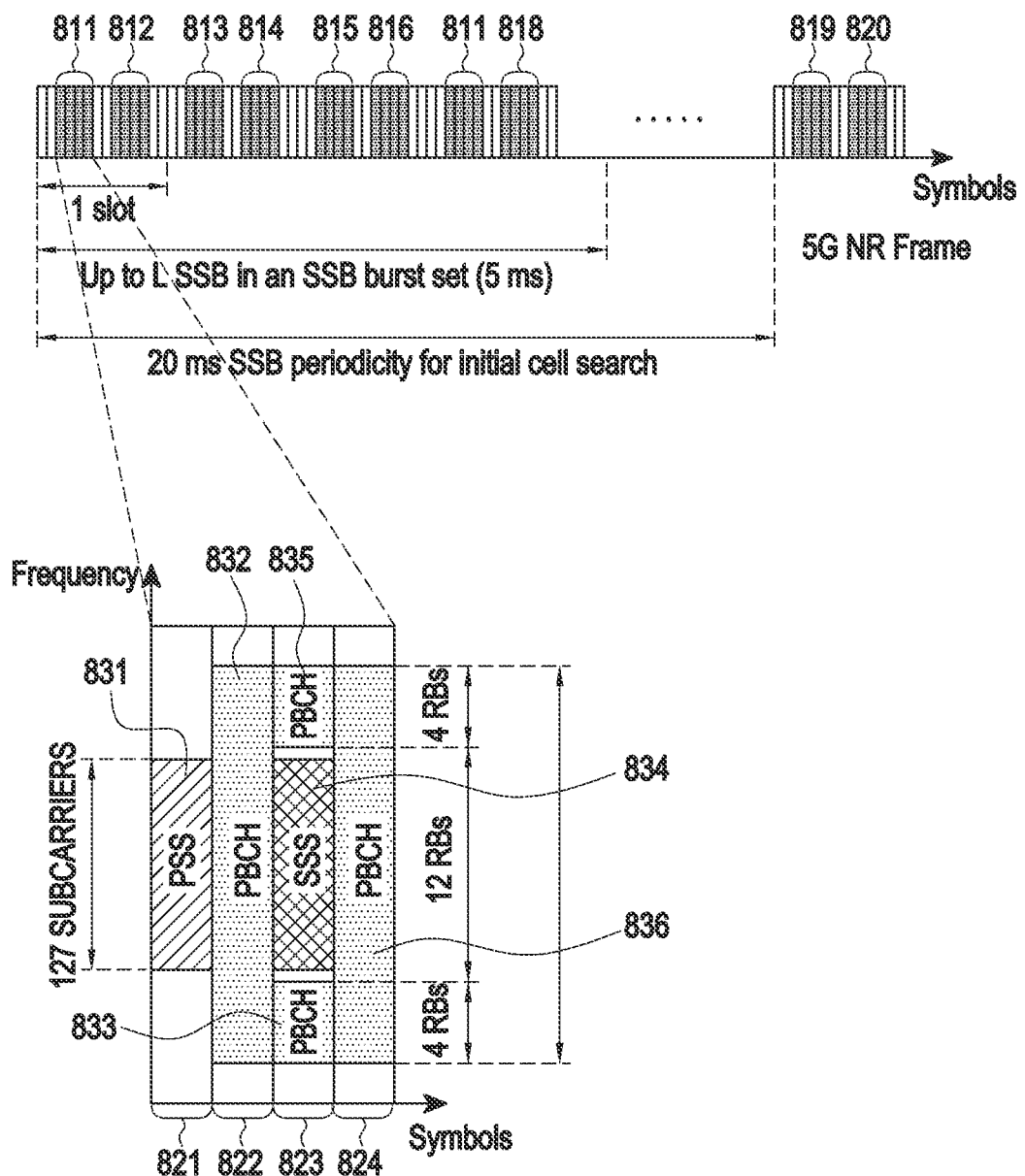
FIG. 8 is a view illustrating a structure of a synchronization signal block (SSB) transmitted from a base station according to an embodiment of the disclosure.

FIG. 8 is a view illustrating a structure of an SSB transmitted from a base station according to an embodiment of the disclosure.

Referring to FIG. 8, the base station may periodically transmit SSBs. For example, the base station may transmit SSBs 811, 812, 813, 814, 815, 816, 817, 818, 819, and 820 as illustrated in FIG. 8. In the example of FIG. 8, the base station is shown as transmitting two SSBs in one slot, e.g., 14 symbols, but it will be appreciated by one of ordinary skill in the art that the number of SSBs in one slot is not limited thereto. The base station may transmit L SSBs. The L SSBs may be referred to as an SSB burst set. The length of the SSB burst set may be 5 ms. The transmission period of the SSB burst set may be 20 ms but is not limited thereto. The base station may form the L SSBs of the SSB burst set into different beams, which may be expressed as the 'base station performs beam-sweeping.' The base station may form the SSB of the SSB burst set in different directions based on digital beamforming and/or analog beamforming. Through the beam sweeping of the base station, the transmission coverage of the SSB may be increased.

A first symbol 821 of the SSB 811 may include a primary synchronization signal (PSS) 831, a second symbol 822 may include a first part 832 of a physical broadcast channel (PBCH), a third symbol 823 may include a second part 833 of the PBCH, a secondary synchronization signal (SSS) 834, and a third part 835 of the PBCH, and a fourth symbol 824 may include a fourth part 836 of the PBCH.

According to an embodiment of the disclosure, an electronic device 101 (e.g., at least one of the processor 120, the first communication processor 212, the second communication processor 214, the integrated communication processor 260, or the integrated SoC) may select an optimal SSB. For example, the electronic device 101 may measure the reception strength of each of the SSBs 811, 812, 813, 814, 815, 816, 817, 818, 819, and 820 formed by the base station. As each of the SSBs 811, 812, 813, 814, 815, 816, 817, 818, 819, and 820 is formed as a different beam, intensities measured by the electronic device 101 may be different. The electronic device 101 may select, e.g., an SSB having the largest reception strength. The electronic device 101 may identify, e.g., an SSB index measured as the largest reception strength. SSB index may be interchangeably used with beam index. The electronic device 101 may report information regarding the selected beam index to the base station.

Figure 9:
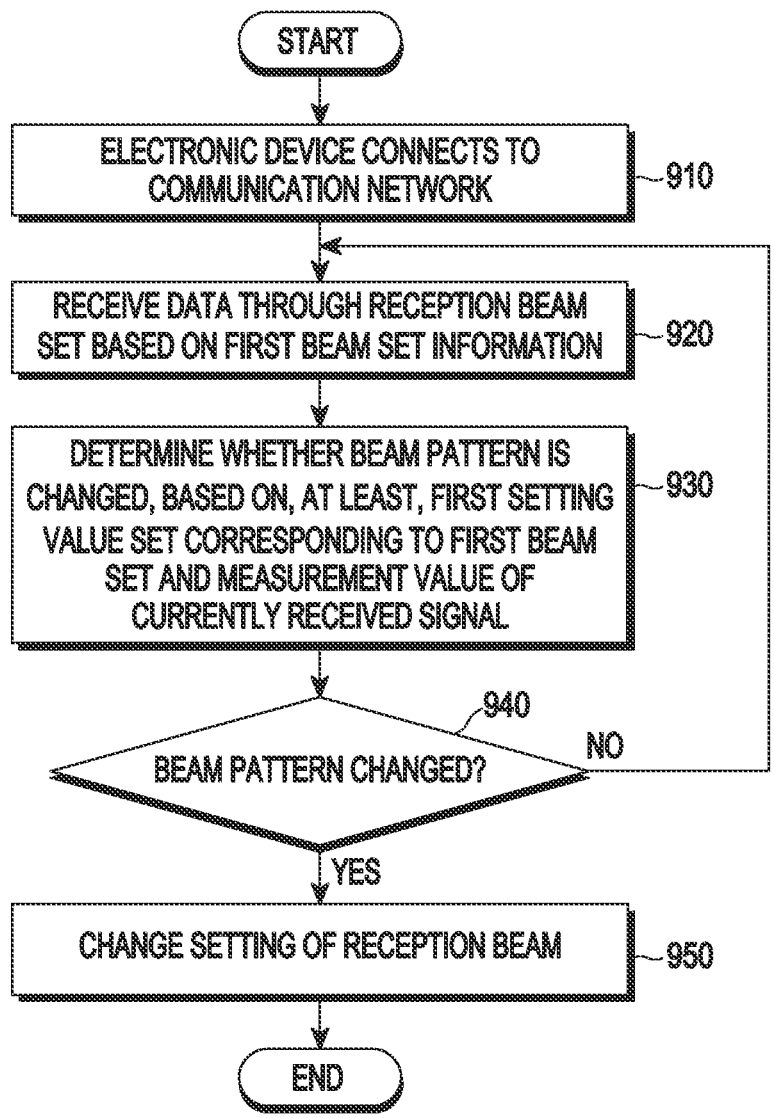
FIG. 9 is a flowchart illustrating an operation method of an electronic device according to an embodiment of the disclosure.

FIG. 9 is a flowchart illustrating an operation method of an electronic device according to an embodiment of the disclosure. Referring to FIG. 9, in operation 910, the electronic device 101 may connect to a communication network (e.g., a base station). In operation 920, the electronic device 101 may receive data through a reception beam set based on first beam set information among a plurality of beam set information (e.g., the first beam set information 671 and the second beam set information 672 of FIG. 6). In operation 930, the electronic device 101 may determine whether a beam pattern for the reception beam is changed (or whether a state related to the electronic device 101 is changed). The beam pattern may include at least one of a beam direction, a beam width, a gain, a beam shape (e.g., beam distortion), and the number of beams (e.g., the number of side lobes) for each reception beam) or whether to adjust the phase. Whether the beam pattern is changed may be determined based on, at least, a first setting value set corresponding to the first beam set information and a measurement value measured by beamforming performed based on the first beam set information. The first setting value may correspond to a measurement value identified via an inspection or verification executed by performing beamforming based on the first beam set information before the electronic device 101 is released or a default setting value generated based on the measurement value. For example, the electronic device 101 may compare the first setting value with a measurement value of a signal currently received through the antenna module and, if the difference is a set threshold or more, may determine that the beam pattern is changed. The determination of whether the beam pattern is changed may be performed, at least once, on the currently selected reception beam or may be performed on a plurality of reception beams included in the corresponding beam set.

The electronic device 101 may determine that the beam pattern is changed or that the state related to the electronic device is changed based on the value measured by at least one sensor (e.g., a grip sensor). For example, the electronic device 101 may determine that the beam pattern is changed or that the state related to the electronic device is changed based on at least part of the grip position and/or the grip strength measured by the grip sensor.

If it is determined in operation 940 that the beam pattern is not changed (or if it is determined that the state related to the electronic device 101 is not changed) (No in operation 940), the electronic device 101 may receive data through the reception beam set based on the first beam set information currently set in operation 920.

If it is determined in operation 940 that the beam pattern is changed (or if it is determined that the state related to the electronic device 101 is changed) (Yes in operation 940), the electronic device 101 may change the setting of the reception beam in operation 950.

If it is determined in operation 940 that the beam pattern is changed (or it is determined that the state related to the electronic device 101 is changed), the electronic device 101 (e.g., the communication processor 680) may change the beam set information to be used from the first beam set information 671 to the second beam set information 672 among the plurality of beam set information. If it is determined that the beam pattern is changed (or if it is determined that the state related to the electronic device 101 is changed), the electronic device 101 may adjust at least one piece of setting information (or parameter) related to the change in the reception beam (e.g., number of beams, number of antenna modules, beam gain, beam set structure, beam change threshold, beam change count, module monitoring threshold, module change threshold, module change count, or context change threshold). Specific embodiments of changing the settings related to the reception beam in the electronic device 101 are described in detail with reference to FIGS. 11 and 12.

The electronic device 101 may perform at least one of the operations illustrated in FIG. 9 when the electronic device is first executed to reflect the deviation between the electronic devices. For example, the electronic device 101 may perform the operation 950 of changing the reception beam setting even when no change in beam pattern is detected in operation 940 when it is first executed.

Figure 10:
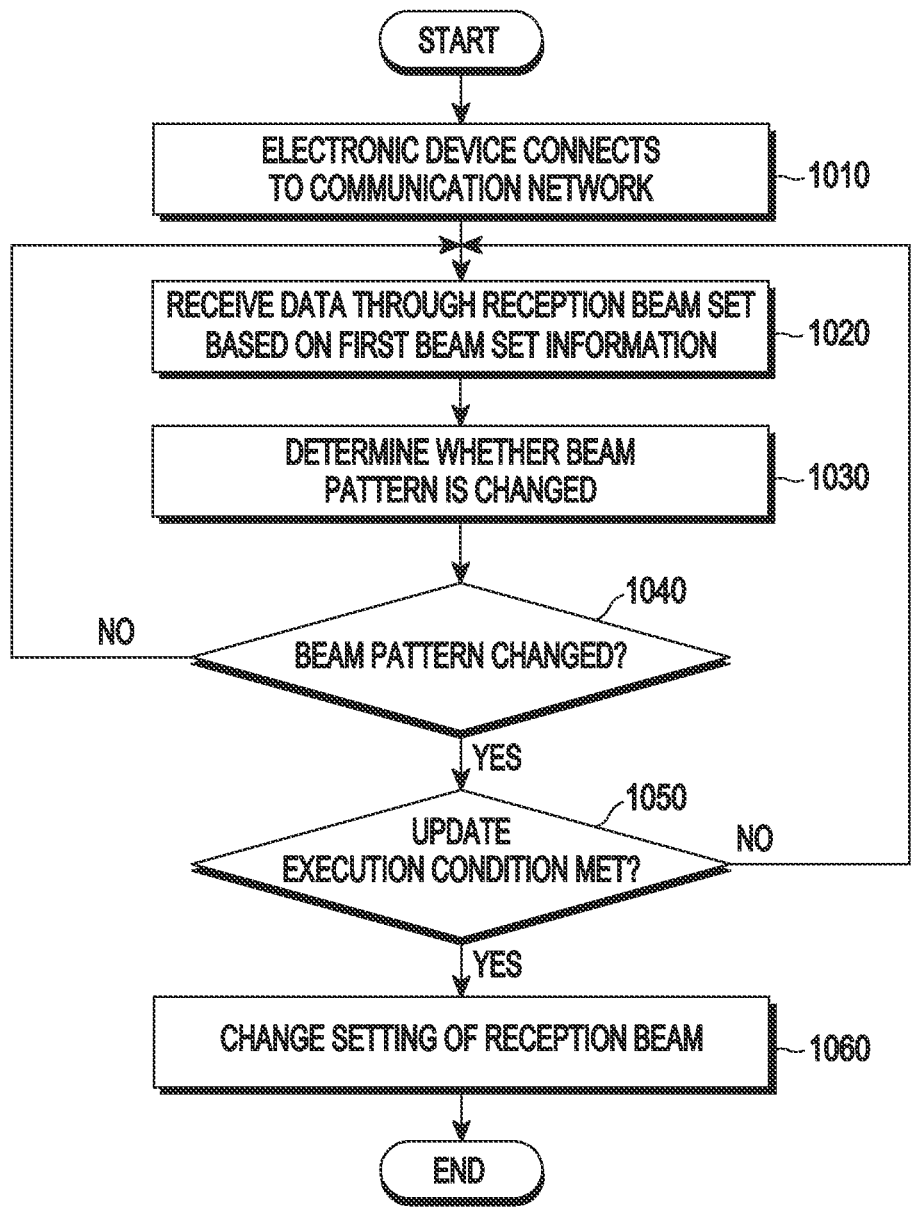
FIG. 10 is a flowchart illustrating an operation method of an electronic device according to an embodiment of the disclosure.

FIG. 10 is a flowchart illustrating an operation method of an electronic device according to an embodiment of the disclosure.

Referring to FIG. 10, in operation 1010, the electronic device 101 (e.g., the communication processor 680) may connect to a communication network (e.g., a base station). In operation 1020, the electronic device 101 may receive data through a reception beam set based on first beam set information among a plurality of beam set information (e.g., the first beam set information 671 and the second beam set information 672 of FIG. 6).

In operation 1030, the electronic device 101 may determine whether a beam pattern for the reception beam is changed (or whether a state related to the electronic device 101 is changed). The beam pattern may include at least one of a beam direction, a beam width, a gain, a beam shape (e.g., beam distortion), and the number of beams (e.g., the number of side lobes) for each reception beam) or whether to adjust the phase. Whether the beam pattern is changed may be determined based on, at least, a first setting value set corresponding to the first beam set information and a measurement value measured by beamforming performed based on the first beam set information. The first setting value may correspond to a measurement value identified via an inspection or verification executed by performing beamforming based on the first beam set information before the electronic device 101 is released or a default setting value generated based on the measurement value. For example, the electronic device 101 may compare the first setting value with a measurement value of a signal currently received through the antenna module and, if the difference is a set threshold or more, may determine that the beam pattern is changed. The determination of whether the beam pattern is changed may be performed, at least once, on the currently selected reception beam or may be performed on a plurality of reception beams included in the corresponding beam set.

The electronic device 101 may determine that the beam pattern is changed or that the state related to the electronic device is changed based on the value measured by at least one sensor (e.g., a grip sensor). For example, the electronic device 101 may determine that the beam pattern is changed or that the state related to the electronic device is changed based on at least part of the grip position and/or the grip strength measured by the grip sensor.

If it is determined in operation 1040 that the beam pattern is not changed (or if it is determined that the state related to the electronic device 101 is not changed) (No in operation 1040), the electronic device 101 may receive data through the reception beam set based on the first beam set information currently set in operation 1020.

If it is determined in operation 1040 that the beam pattern is changed (or if it is determined that the state related to the electronic device 101 is changed) (Yes in operation 1040), the electronic device 101 may determine whether an update execution condition is met in operation 1050.

Whether the update execution condition is met may be determined through at least one of the reception signal strength (e.g., reference signal received power (RSRP), signal to interference plus noise ratio (SINR), or reference signal received quality (RSRQ)), the distribution and/or variation of the reception signal strength (e.g., standard deviation, maximum-minimum difference, or interference amount), and the value measured by a sensor.

Figure 13A:
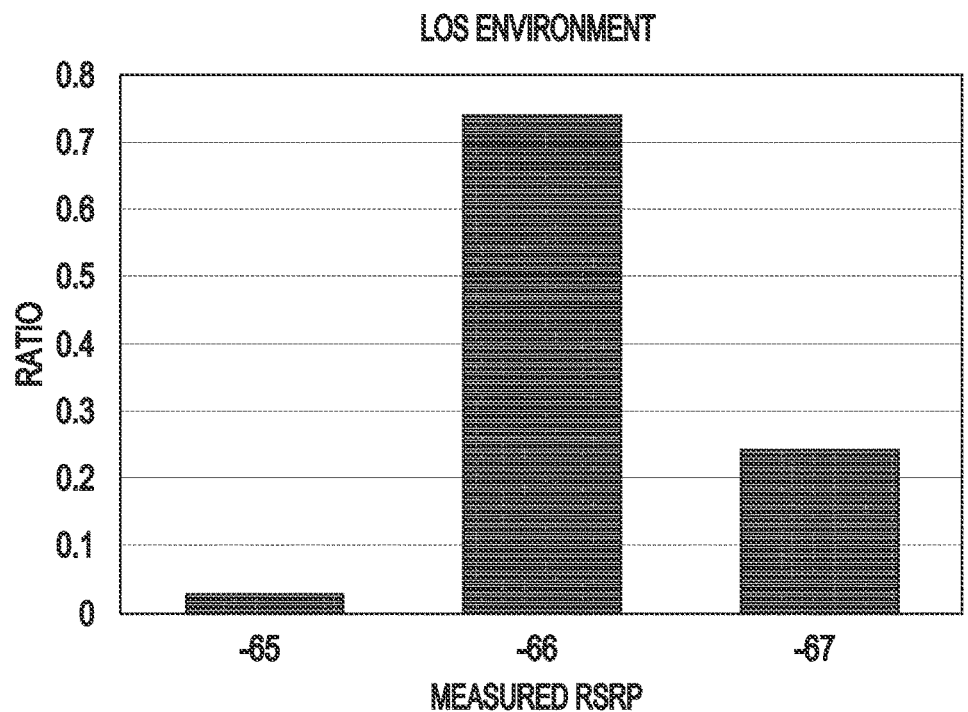
FIG. 13A is a graph illustrating a distribution of reception signal strengths measured in a line-of-sight (LOS) environment, according to an embodiment of the disclosure.
Figure 13B:
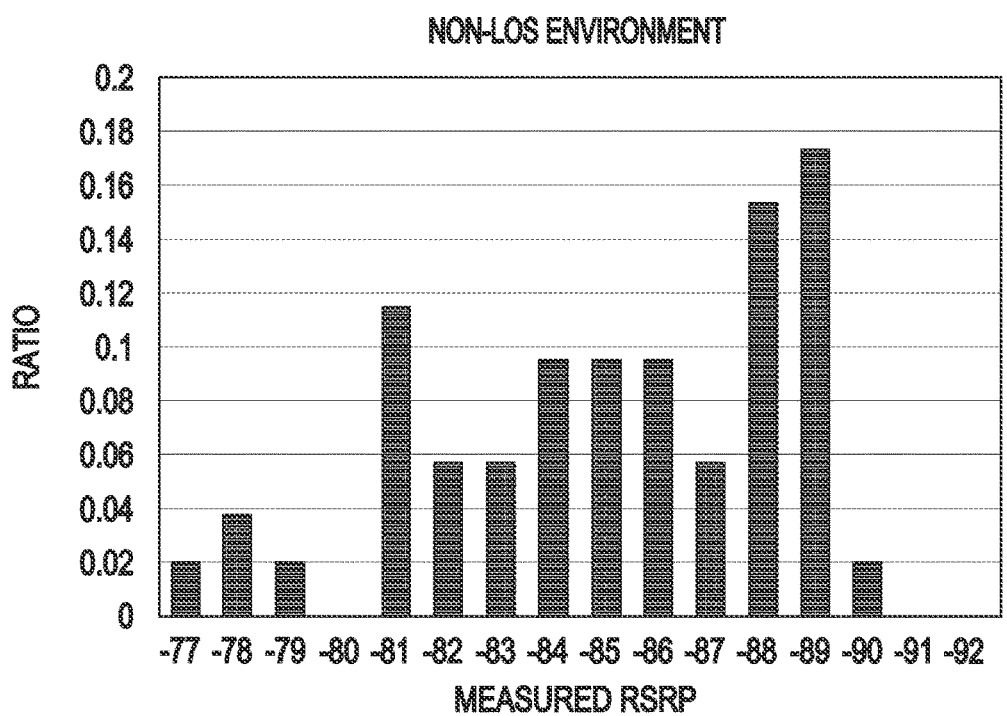
FIG. 13B is a graph illustrating a distribution of reception signal strengths measured in a non-LOS environment, according to an embodiment of the disclosure.

Whether the update execution condition is met may be determined according to whether the electronic device 101 is in a line-of-sight (LOS) environment or a non-LOS environment. FIG. 13A is a graph illustrating a distribution of reception signal strengths measured in a LOS environment according to an embodiment of the disclosure, and FIG. 13B is a graph illustrating a distribution of reception signal strengths measured in a non-LOS environment according to an embodiment of the disclosure.

Referring to FIG. 13A, as a result of measuring the strengths of reception signals multiple times using the current reception beam in the LOS environment, it may be identified that the reception signal strengths are distributed in a ratio of −65 dBm of 3%, −66 dBm of 73%, and −67 dBm of 24%. Referring to FIG. 13B, as a result of measuring the strengths of reception signals using the current reception beam in the non-LOS environment, it may be identified that the reception signal strengths are distributed in various values from −77 dBm to −90 dBm. For example, in the LOS environment, the change in the reception signal strength is not large whereas in the non-LOS (e.g., in a blocking context), the change in the reception signal strength may appear relatively large. If it is determined that the current state is the LOS environment as illustrated in FIG. 13A as a result of measuring the reception signal strength, the electronic device 101 may determine that the update execution condition is met in operation 1050. For example, the electronic device 101 may quantify the distribution of the reception signal strengths (e.g., calculating a standard deviation of the reception signal strengths) and, if a set condition is met, estimate the current state as the state of the LOS environment and may determine that the update execution condition is met.

If it is determined in operation 1050 that the update execution condition is met (Yes in operation 1050), the electronic device 101 may change the setting of the reception beam in operation 1060. If it is determined in operation 1050 that the update execution condition is met, the electronic device 101 (e.g., the communication processor 680) may change the beam set information to be used from the first beam set information 671 to the second beam set information 672 among the plurality of beam set information. If it is determined that the update execution condition is met, the electronic device 101 may adjust at least one piece of setting information (or parameter) related to the change in the reception beam (e.g., number of beams, number of antenna modules, beam gain, beam set structure, beam change threshold, beam change count, module monitoring threshold, module change threshold, module change count, or context change threshold). Specific embodiments of changing the settings related to the reception beam in the electronic device 101 are described below with reference to FIGS. 11 and 12.

If it is determined that the update execution condition is not met in operation 1050 (No in operation 1050), the electronic device 101 may receive data based on the setting of the reception beam and/or the beam set currently set in operation 1020.

Figure 11:
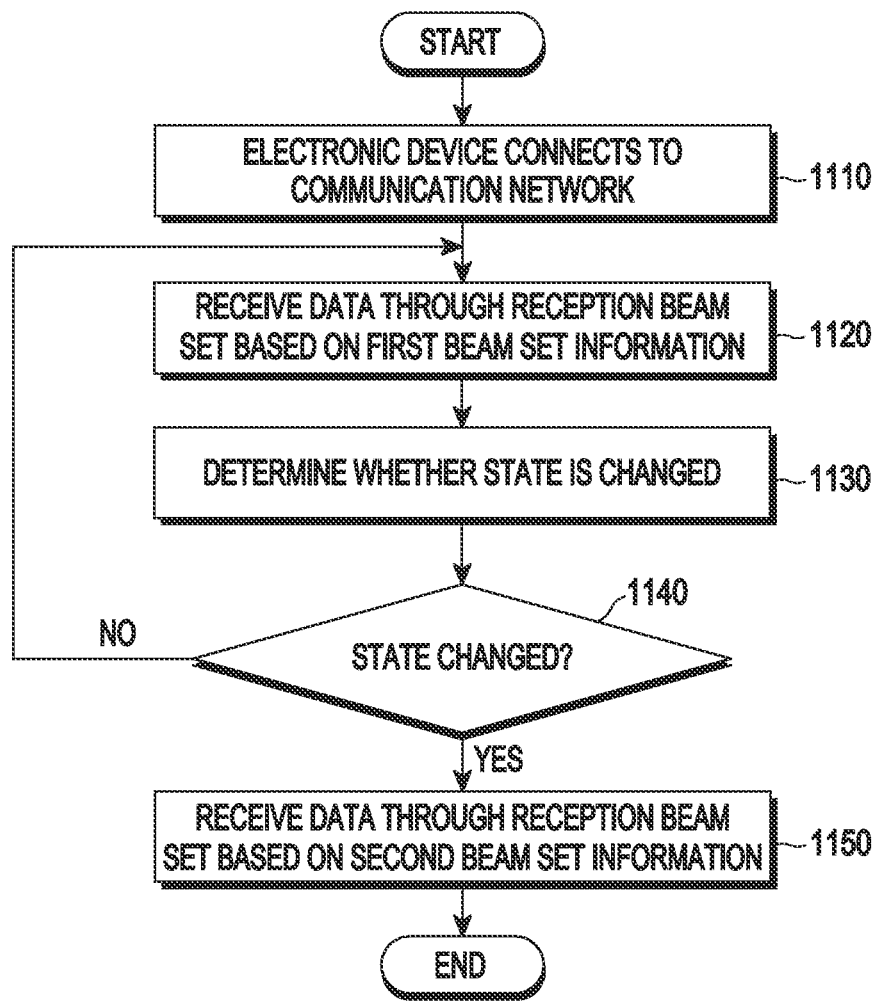
FIG. 11 is a flowchart illustrating an operation method of an electronic device according to an embodiment of the disclosure.

FIG. 11 is a flowchart illustrating an operation method of an electronic device according to an embodiment of the disclosure. Referring to FIG. 11, in operation 1110, the electronic device 101 (e.g., the communication processor 680) may connect to a communication network (e.g., a base station). In operation 1120, the electronic device 101 may receive data through a reception beam set based on first beam set information among a plurality of beam set information (e.g., the first beam set information 671 and the second beam set information 672 of FIG. 6).

The electronic device 101 may determine whether a state related to the electronic device 101 is changed in operation 1130. The electronic device 101 may determine whether the state related to the electronic device 101 is changed based on at least part of the second setting value included in the second beam set information 672 and the measurement value measured by beamforming performed based on the first beam set information 671. For example, if the measurement value measured by beamforming performed based on the first beam set information 671 is closer to the second setting value included in the second beam set information 672 than to the first setting value included in the first beam set information 671, the electronic device 101 may determine that the state of the electronic device 101 is changed from the first state to the second state.

The electronic device 101 may determine that the state related to the electronic device 101 is changed based on the value measured by at least one sensor (e.g., a grip sensor).

If it is determined in operation 1140 that the state related to the electronic device 101 is not changed (No in operation 1140), the electronic device 101 may receive data through the reception beam set based on the first beam set information currently set in operation 1120.

If it is determined in operation 1140 that the state related to the electronic device 101 is changed (Yes in operation 1140), the electronic device 101 may receive data through the reception beam set based on the second beam set information corresponding to the second state among the plurality of beam set information in operation 1150.

The electronic device 101 may measure the reception signal strength through at least one reception beam corresponding to the second beam set information. The electronic device 101 may compare the reception signal strength of the reception beam corresponding to the second beam set information with the reception signal strength of the reception beam corresponding to the currently set first beam set information, determining whether the beam set is changed. For example, if the reception signal strength of the reception beam corresponding to the second beam set information is larger than the reception signal strength of the reception beam corresponding to the first beam set information, the electronic device 101 may determine to change the beam set information and may receive data through a reception beam set based on the second beam set information. In contrast, if the reception signal strength of the reception beam corresponding to the second beam set information is smaller than the reception signal strength of the reception beam corresponding to the first beam set information, the electronic device 101 may determine not to change the beam set information and may receive data through a reception beam set based on the currently set first beam set information.

According to an embodiment of the disclosure, a method for comparing beam sets when determining whether to change the beam set information may include comparing the largest reception signal strengths among the plurality of reception beams included in each beam set and comparing the average values of all of the reception signal strengths of the plurality of reception beams included in each beam set.

Comparison in performance between the beam sets may use a distribution of reception signal strengths measured using the currently used beam set information (e.g., the first beam set information) and a distribution of the reception signal strengths measured using other available beam set information (e.g., the second beam set information).

Figure 14:
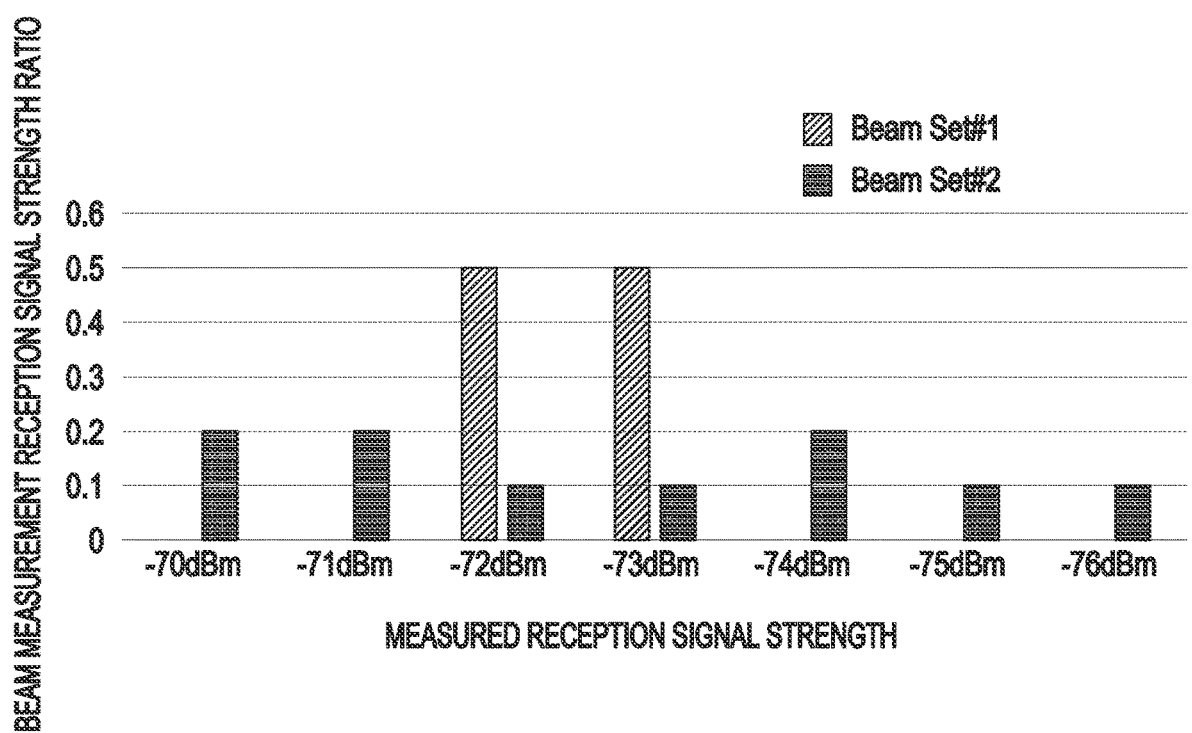
FIG. 14 is a graph illustrating a distribution of reception signal strengths for each beam set according to an embodiment of the disclosure.

FIG. 14 is a graph illustrating a distribution of reception signal strengths for each beam set according to an embodiment of the disclosure.

Referring to FIG. 14, as a result of measuring the strengths of reception signals multiple times using a first beam set (Beam Set #1), it may be identified that the reception signal strengths are distributed in a ratio of −72 dBm of 50% and −73 dBm of 50%. As a result of measuring the strengths of the reception signals multiple times using a second beam set (Beam Set #2), it may be identified that the reception signal strengths are distributed in a ratio of −70 dBm of 20%, −71 dBm of 20%, −72 dBm of 10%, −73 dBm of 10%, −74 dBm of 20%, −75 dBm of 10%, and −76 dBm of 10%.

According to the graph of FIG. 14, the reception signal strength of the first beam set is relatively stable compared to that of the second beam set. For example, if relatively stable data transmission/reception is desired, the electronic device may select the first beam set. If data transmission/reception is desired at a high reception signal strength although not stable relatively, the electronic device may select the second beam set.

It may be identified that the second beam set may receive data at a higher signal reception strength than the first beam set but has a larger reception signal change range. In the case illustrated in FIG. 14, since the probability of having a higher signal reception strength and a probability of having a lower signal reception strength when the second beam set is used than when the first beam set is used are the same, the first beam set or the second beam set may be selected depending on the use condition of the electronic device or the beam operation algorithm being applied (e.g., setting information related to a change in reception beam).

Figure 12:
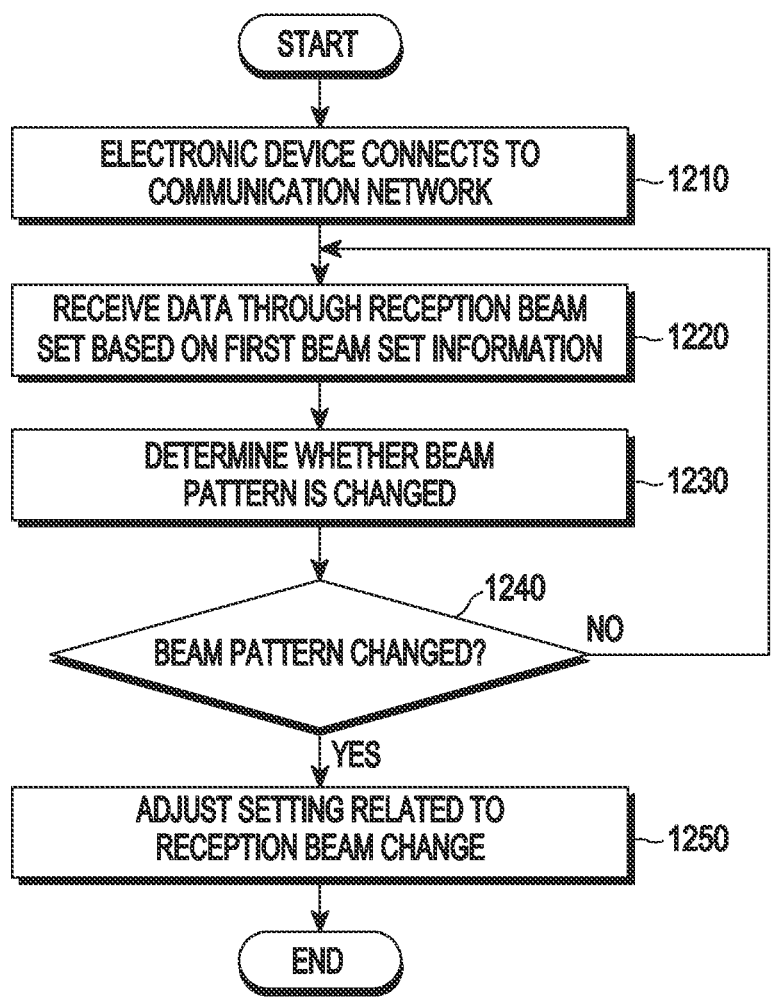
FIG. 12 is a flowchart illustrating an operation method of an electronic device according to an embodiment of the disclosure.

FIG. 12 is a flowchart illustrating an operation method of an electronic device according to an embodiment of the disclosure. Referring to FIG. 12, in operation 1210, the electronic device 101 may connect to a communication network (e.g., a base station). In operation 1220, the electronic device 101 may receive data through a reception beam set based on first beam set information among a plurality of beam set information (e.g., the first beam set information 671 and the second beam set information 672 of FIG. 6).

In operation 1230, the electronic device 101 (e.g., the communication processor 680) may determine whether a beam pattern for the reception beam is changed (or whether a state related to the electronic device 101 is changed). The beam pattern may include at least one of a beam direction, a beam width, a gain, a beam shape (e.g., beam distortion), and the number of beams (e.g., the number of side lobes) for each reception beam) or whether to adjust the phase. Whether the beam pattern is changed may be determined based on, at least, a first setting value set corresponding to the first beam set information and a measurement value measured by beamforming performed based on the first beam set information.

The electronic device 101 may determine that the beam pattern is changed or that the state related to the electronic device is changed based on the value measured by at least one sensor (e.g., a grip sensor). For example, the electronic device 101 may determine that the beam pattern is changed or that the state related to the electronic device is changed based on at least part of the grip position and/or the grip strength measured by the grip sensor.

If it is determined in operation 1240 that the beam pattern is not changed, or if it is determined that the state related to the electronic device 101 is not changed, (No in operation 1240), then the electronic device 101 may receive data through the reception beam set based on the first beam set information currently set in operation 1220.

If it is determined in operation 1240 that the beam pattern is changed, or if it is determined that the state related to the electronic device 101 is changed, (Yes in operation 1240), then the electronic device 101 may adjust the setting information (or parameter) related to the change in reception beam in operation 1250. For example, the setting information (or parameter) related to the change in reception beam may include at least one of the number of beams, the number of antenna modules, a beam gain, a beam set structure, a beam change threshold, a beam change count, a module monitoring threshold, a module change threshold, a module change count, or a context change threshold, as shown in Table 2 below.

TABLE 2

| Setting information (parameter) | Setting value (example) |
|---|---|
| number of beams | wide beams: 3, narrow beams: 7 |
| number of antenna modules | 3 |
| beam gain | wide beam: 3 dB, narrow beam: 6 dB |
| beam set structure | hierarchical structure applied |
| beam change threshold | 3 dB |
| beam change count | 2 |
| module monitoring threshold | −90 dBm |
| module change threshold | 5 dB |
| module change count | 3 |
| context change threshold | 5 dB (average)/10 dB (instantaneous) |

Referring to Table 2, the number of beams indicates the number of reception beams included in the currently used beam set, and each reception beam may be distinguished by a beam identifier (id) as described above in connection with Table 1. If a corresponding beam set forms a hierarchical structure in which wide beams and narrow beams are mapped, it may be configured with three wide beams and seven narrow beams as exemplified in Table 2 and FIG. 16C. The number of antenna modules indicates the number of antenna modules provided in the electronic device 101 and may be one, two, or three or more. A different beam set and/or reception beam may be set for each antenna module. The beam set structure may indicate whether a hierarchical structure is applied. If the beam set structure is set to apply a hierarchical structure, it may be set so that a plurality of wide beams are configured, and at least one narrow beam is mapped to each wide beam as illustrated in FIG. 16C. The beam gain may be set for a wide beam or a narrow beam. An optimal reception beam may be found based on a difference between a preset beam gain and an actually measured reception signal strength. The beam change threshold means a threshold for changing the serving beam. If the beam change threshold is set to 3 dB, the serving beam may be changed if the reception strength of another reception beam is 3 dB or larger than the reception strength of the reception beam being currently used (e.g., the serving beam). The beam change count may mean a value for operating to change the currently used reception beam to another beam when the beam change threshold is continuously exceeded by a set number of times. The module monitoring threshold may mean a value set to monitor an antenna module other than the currently used antenna module. For example, in a case where the module monitoring threshold is set to −90 dBm, if the signal strength of the signal received through the currently used antenna module is −90 dBm or less, it may operate to monitor another antenna module. The module change threshold means a threshold for changing the antenna module. If the module change threshold is set to 5 dB, a change of the antenna module may be performed when the reception strength at another antenna module is 5 dB or larger than the reception strength at the currently used antenna module. The module change count may mean a value for operating to change the currently used antenna module to another antenna module when the module change threshold is continuously exceeded by a set number of times. The context change threshold may mean a value for determining cases where the result of measurement using the existing reception beam is difficult to use as the state of the electronic device 101 is changed by a set value or more.

A plurality of pieces of reception beam change-related setting information (or parameters) may be grouped and/or prioritized.

Figure 15:
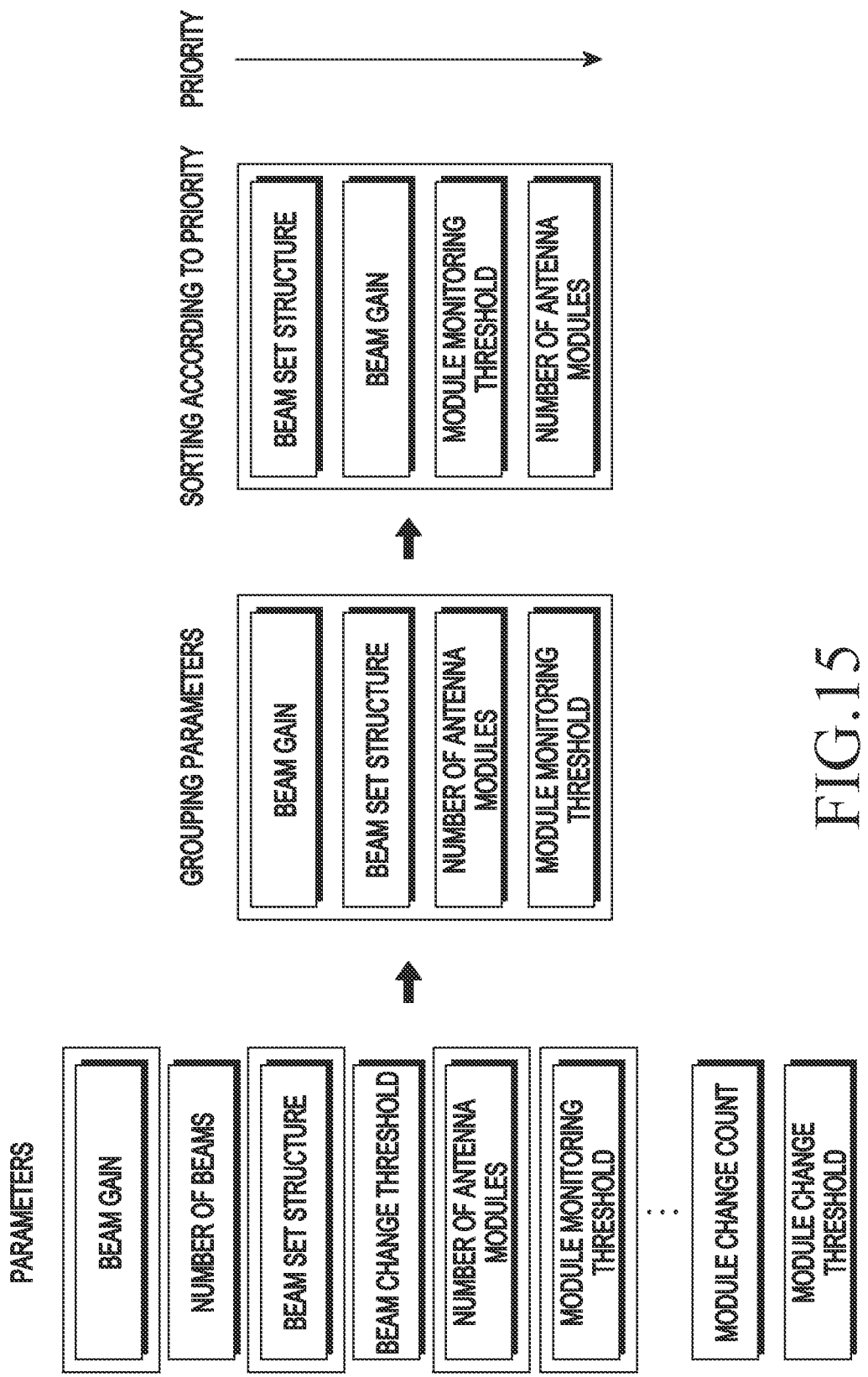
FIG. 15 is a view illustrating grouping and prioritizing of setting information related to a reception beam change according to an embodiment of the disclosure.

FIG. 15 is a view illustrating grouping and prioritizing of setting information (or parameters) related to a reception beam change according to an embodiment of the disclosure.

Referring to FIG. 15, setting information (or parameters) related to a change in reception beam may include at least one of a beam gain, the number of beams, a beam set structure (e.g., a hierarchical structure of wide beams and narrow beams), a beam change threshold, the number of antenna modules, a module monitoring threshold, a module change count, and a module change threshold.

The electronic device 101 may group at least two pieces of setting information among the plurality of pieces of setting information (or parameters). For example, as illustrated in FIG. 15, the beam gain, the beam set structure, the number of antenna modules, and the module monitoring threshold may be bundled into one group and applied. Various conditions may be set for the grouping. For example, to reidentify the beam set structure, the reception signal strengths of a plurality of wide beams (WB) and a plurality of narrow beams (NB) may be all measured. Since the beam gains of the WB and the NB may be simultaneously identified in the operation of identifying the beam set structure, the setting information (or parameters) of the beam set structure and the beam gain may be grouped.

The grouped setting information (or parameters) may be sorted according to priority, and each setting information (or parameter) may be sequentially adjusted according to the priority. For example, as illustrated in FIG. 15, priority may be set in the order of the beam set structure, beam gain, module monitoring threshold, and number of antenna modules. The priority may be different depending on the type of setting information applied to the electronic device 101. For example, if the setting information currently applied to the electronic device is the beam set structure, and a hierarchical structure is applied thereto, the priority of the beam set structure among the plurality of pieces of setting information (or parameters) may be set to be the highest.

The priority of the setting information related to the change in reception beam applied to the electronic device may be set to differ according to the beam pattern. For example, if there are many beams and the beams cover a narrow area, the differences in reception signal strength between the optimal beam and the other beams are large so that the beam change threshold may be relatively less sensitive. For example, if the reception signal strength of the optimal beam is −70 dBm in the LOS environment, the reception signal strengths of the other beams may be −75 dBm or more and, as such, such cases where the difference in value is large may occur. In this case, the beam change threshold may be set to have a relatively low priority. In contrast, when the number of beams is small, and the beams cover a broad range, if the differences in reception signal strength between the optimal beam and the other beams are not large, the beam change threshold may be set to have a relatively high priority.

If the parameters are grouped and priority is set thereto, the electronic device 101 may determine at least one of the order of beams to be measured, number of times, and period. For example, the electronic device may measure the reception signal strength of the reference signal (e.g., SSB) periodically received and adjust at least one value of the above-described plurality of pieces of setting information (or parameters) based on the result of measurement.

As described above, the plurality of reception beams included in each beam set may be set so that a plurality of wide beams and a plurality of narrow beams are hierarchically structured. For example, FIGS. 16A, 16B, and 16C are views illustrating a measurement relationship between wide beams and narrow beams measured at a first time, and FIGS. 17A, 17B, and 17C are views illustrating a measurement relationship between wide beams and narrow beams measured at a second time after the first time.

Figure 16A:
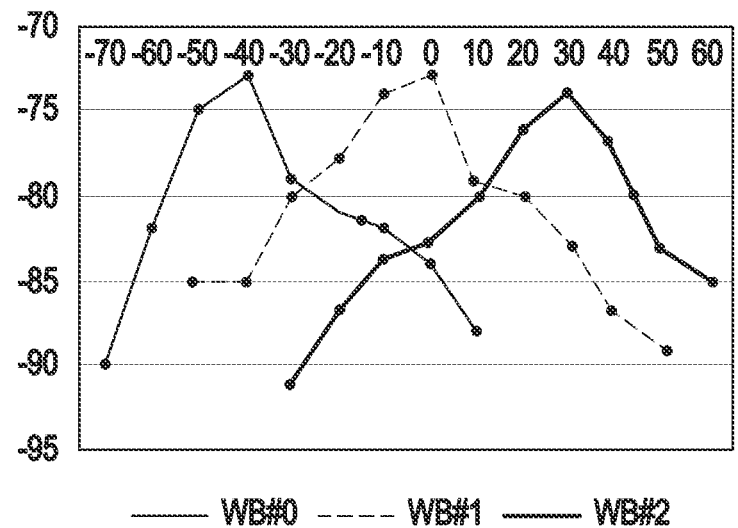
FIG. 16A is a graph illustrating a reception signal strength measured for a wide beam according to an embodiment of the disclosure.

FIG. 16A is a graph illustrating a reception signal strength measured for a wide beam according to an embodiment of the disclosure. FIG. 16B is a graph illustrating a reception signal strength measured for a narrow beam according to an embodiment of the disclosure. FIG. 16C is a view illustrating a hierarchical structure established between a wide beam and a narrow beam according to an embodiment of the disclosure.

Figure 16B:
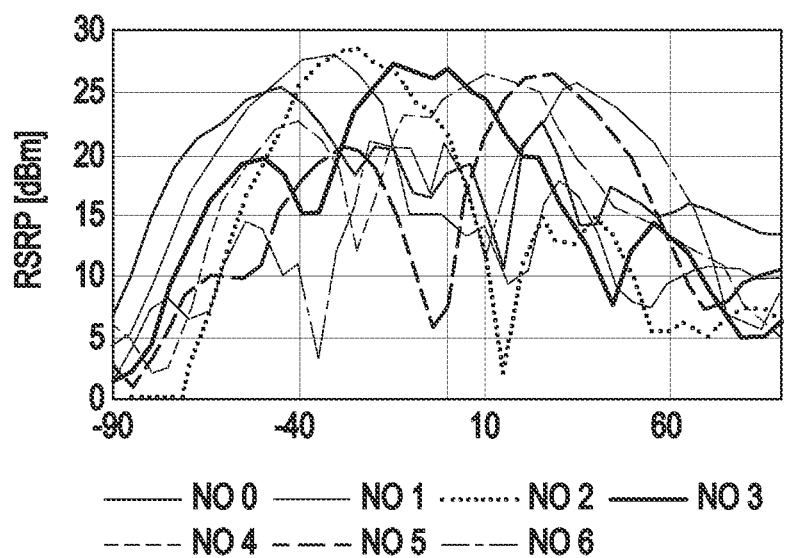
FIG. 16B is a graph illustrating a reception signal strength measured for a narrow beam according to an embodiment of the disclosure.
Figure 16C:
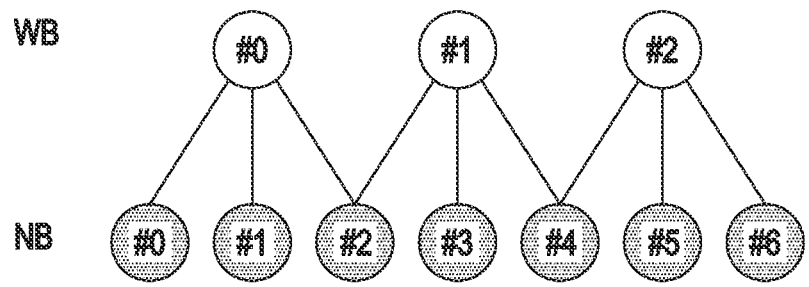
FIG. 16C is a view illustrating a hierarchical structure established between a wide beam and a narrow beam according to an embodiment of the disclosure.
Figure 17A:
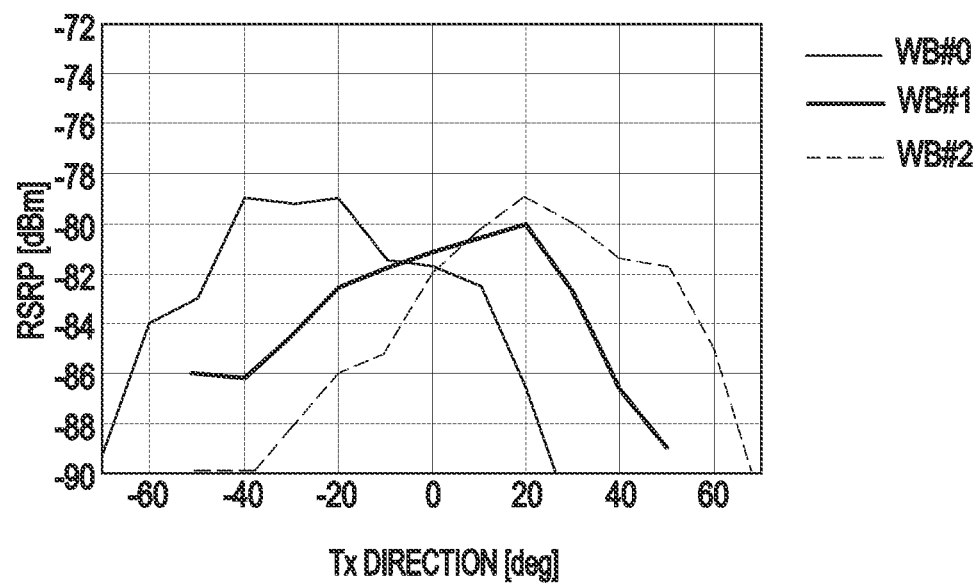
FIG. 17A is a graph illustrating a reception signal strength measured for a wide beam according to an embodiment of the disclosure.
Figure 17B:
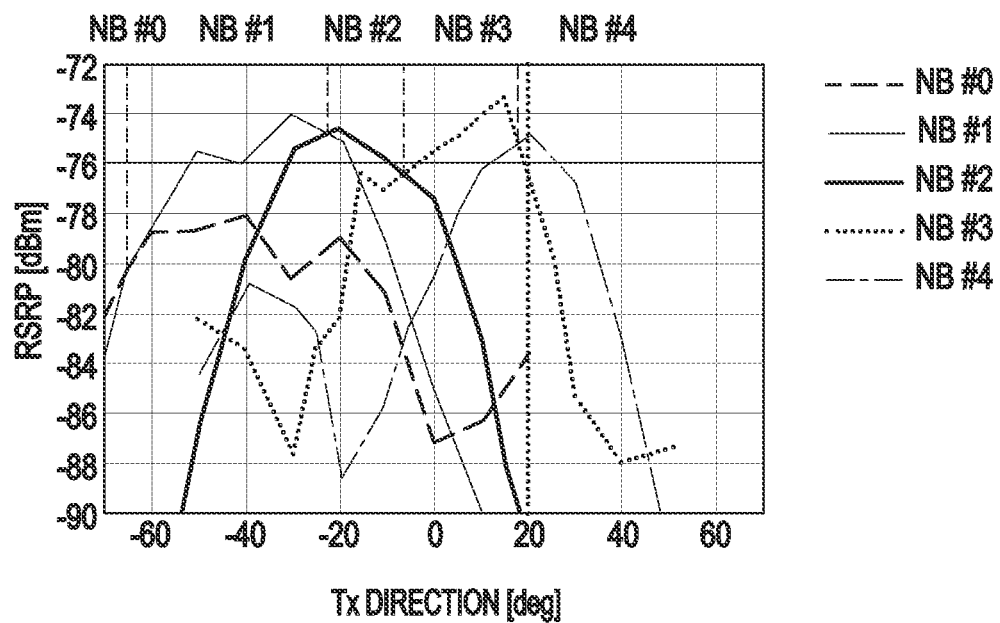
FIG. 17B is a graph illustrating a reception signal strength measured for a narrow beam according to an embodiment of the disclosure.
Figure 17C:
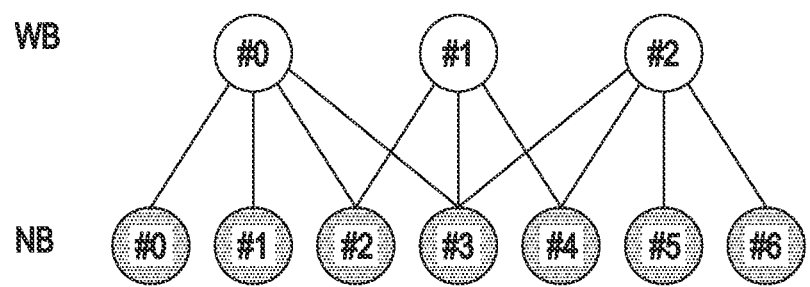
FIG. 17C is a view illustrating a hierarchical structure established between a wide beam and a narrow beam according to an embodiment of the disclosure.

Referring to FIGS. 16A and 16B, the horizontal axis indicates the angle between the base station and the UE, and the vertical axis indicates the RSRP value of the reception signal strength measured with a specific beam. FIG. 16C illustrates a hierarchical structure set based on beam shapes of wide beams measured referring to FIG. 16A and narrow beams measured as shown in FIG. 16B.

Referring to FIG. 16C, the electronic device 101 may set a first narrow beam NB #0, a second narrow beam NB #1, and a third narrow beam NB #2, as a lower layer, for a first wide beam WB #0, the third narrow beam NB #2, a fourth narrow beam NB #3, and a fifth narrow beam NB #4, as a lower layer, for a second wide beam WB #1, and the fifth narrow beam NB #4, a sixth narrow beam NB #5, and a seventh narrow beam NB #6, as a lower layer, for a third wide beam WB #2.

If the strength of each reception beam is measured at the second time after the first time elapses, the strength may be measured as shown in FIGS. 17A and 17B.

FIG. 17A is a graph illustrating a reception signal strength measured for a wide beam according to an embodiment of the disclosure. FIG. 17B is a graph illustrating a reception signal strength measured for a narrow beam according to an embodiment of the disclosure. FIG. 17C is a view illustrating a hierarchical structure established between a wide beam and a narrow beam according to an embodiment of the disclosure.

Referring to FIGS. 17A and 17B, as compared with FIGS. 16A and 16B, it may be identified that each wide beam and each narrow beam have been changed in shape. Referring to FIG. 17C, the electronic device 101 may update the hierarchical structure, depending on the changed shape of the reception beam. The electronic device 101 may perform a reception beam search based on the updated hierarchical structure of FIG. 17C. For example, as a result of comparing the reception strengths of the wide beams, if the reception strength of the first wide beam WB #0 is the largest, the electronic device 101 may measure the reception signal for the fourth narrow beam NB #3 according to the updated result, as well as the first narrow beam NB #0, second narrow beam NB #1, and third narrow beam NB #2 previously set as a lower layer of the first wide beam WB #0.

As the optimal beam is rendered to be selected based on the hierarchical structure as described above, the optimal narrow beam may be selected even though measurement of the reception signal strength is performed a relatively small number of times.

Figure 18:
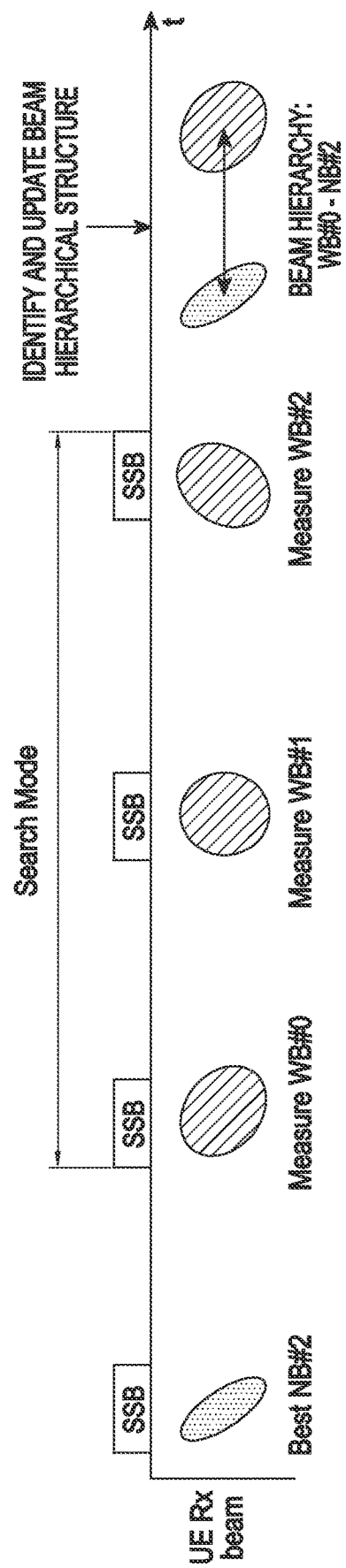
FIG. 18 is a view illustrating an update of a hierarchical structure between wide beams and narrow beams, according to an embodiment of the disclosure.
Figure 19A:
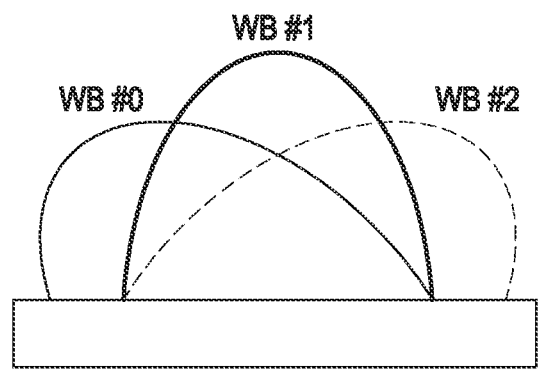
FIG. 19A is a view illustrating a beam shape set for a wide beam according to an embodiment of the disclosure.
Figure 19B:
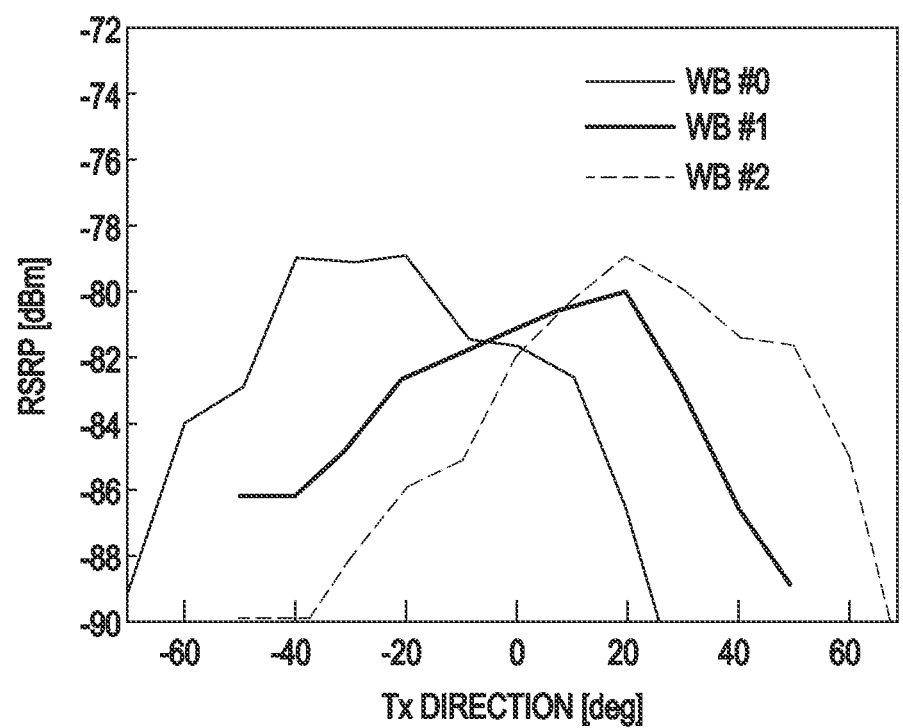
FIG. 19B is a view illustrating a reception signal strength changed for a wide beam according to an embodiment of the disclosure.
Figure 19C:
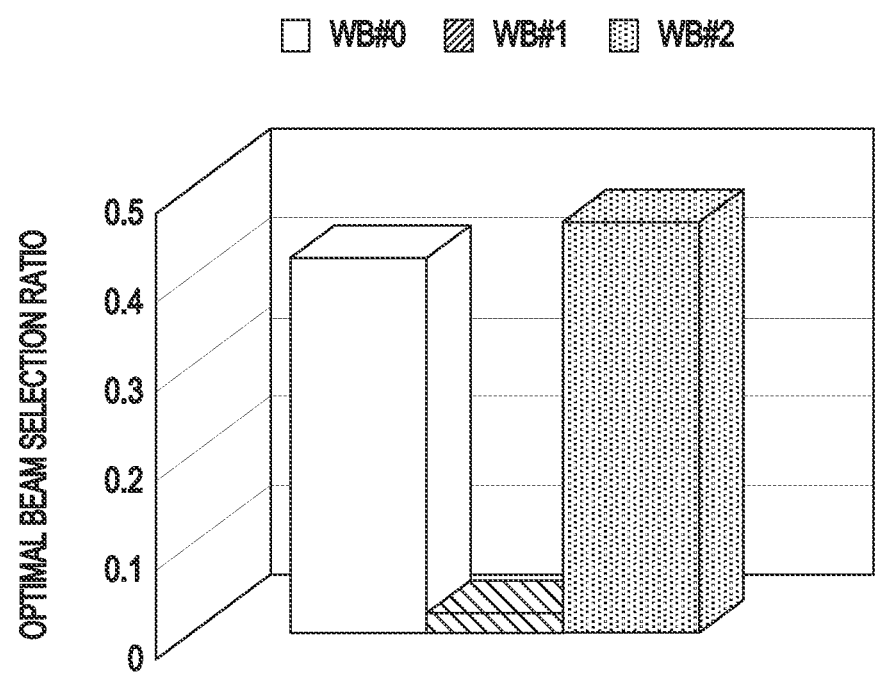
FIG. 19C is a graph illustrating an optimal beam selection ratio for a wide beam according to an embodiment of the disclosure.

FIG. 18 is a view illustrating an update of a hierarchical structure (e.g., a beam set structure) between wide beams and narrow beams, according to an embodiment of the disclosure. FIG. 19A is a view illustrating a beam shape set for a wide beam according to an embodiment of the disclosure. FIG. 19B is a view illustrating a reception signal strength changed for a wide beam according to an embodiment of the disclosure. FIG. 19C is a graph illustrating an optimal beam selection ratio for a wide beam according to an embodiment of the disclosure.

Referring to FIGS. 18, 19A, 19B, and 19C, the reception signal strengths of the first wide beam, the second wide beam, and the third wide beam may be measured during a search mode period, with the third narrow beam NB #2 selected as the optimal reception beam, so that the beam shapes may be identified. It is possible to identify whether the hierarchical structure of the current beam is appropriate by identifying the shapes of the wide beams. For example, as an operation for determining the adequacy of the hierarchical structure between the narrow beam and the wide beam when the electronic device 101 identifies a change in beam pattern, the electronic device 101 may identify the optimal narrow beam and wide beam through the current reception signal strength and, if the difference in reception signal strength is a set value or less, set the two beams as a hierarchical structure.

The beam pattern measured by the electronic device 101 may be changed from FIG. 19A to FIG. 19B. The electronic device 101 may identify the reception signal strength to identify whether the beam used after the change in beam pattern is valid. For example, the electronic device 101 may count optimal reception beams to identify the distributions of the optimal reception beams for a set time as illustrated in FIG. 19C. Referring to FIG. 19C, since the ratio in which the second wide beam WB #1 is selected as the optimal reception beam is low according to the distribution of the optimal reception beams, the electronic device 101 may control to reduce the frequency of measuring the reception signal strength of the second wide beam or not to measure the reception signal strength of the second wide beam.

Figure 20:
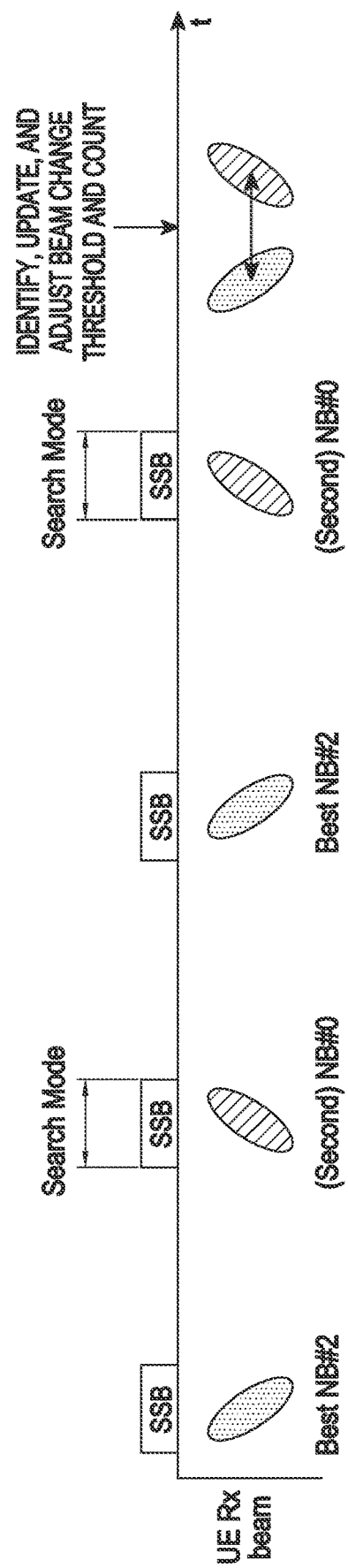
FIG. 20 is a view illustrating a change in a configuration related to a reception beam according to an embodiment of the disclosure.

The electronic device 101 may identify the beam change threshold and the beam change count used after the change in beam pattern and perform the operations of FIG. 20 to update and adjust them as necessary.

FIG. 20 is a view illustrating a change in a configuration related to a reception beam according to an embodiment of the disclosure.

Referring to FIG. 20, if the currently optimal narrow beam is NB #2 and the second optimal narrow beam is NB #0, the signal strengths for the corresponding beams may be measured multiple times. In a case where the measured values are −70 dBm, −72 dBm, −73 dBm, −69 dBm, and −71 dBm for NB #2 and −72 dBm, −71 dBm, −72 dBm, 73 dBm, and 74 dBm for NB #0, if the beam change threshold is 1 dB and the beam change count is 2, such an occasion may occur where the optimal beam is changed from NB #2 to NB #0 and then changed back to NB #2. The beam change threshold may be changed to 2 dB or the beam change count may be changed to 3 so that the ping-pong phenomenon does not occur within a predetermined time in operation. The operation may use the distribution of signal strengths measured several times.

Figure 21:
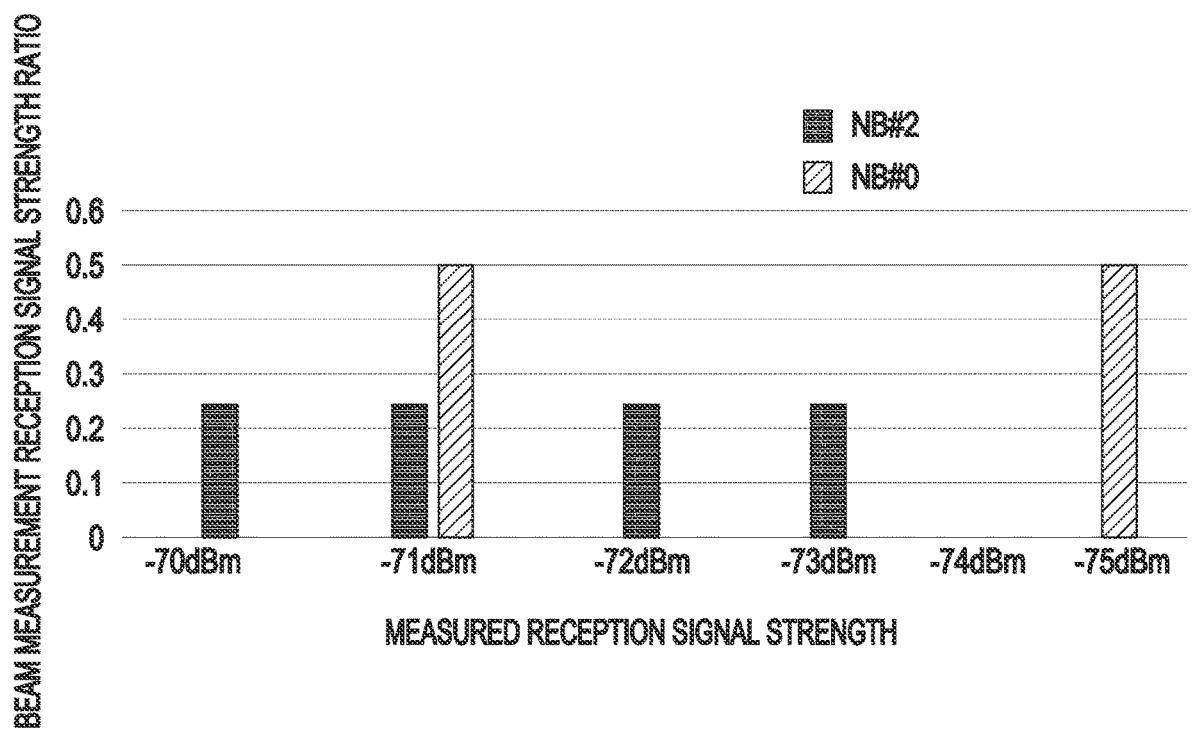
FIG. 21 is a graph illustrating a distribution of reception signal strengths measured for a narrow beam according to an embodiment of the disclosure.

FIG. 21 is a graph illustrating a distribution of reception signal strengths measured for a narrow beam according to an embodiment of the disclosure.

Referring to FIG. 21, it may be identified that, for the reception signal strengths measured at NB #2, −70 dBm, −71 dBm, −72 dBm, and −73 dBm are distributed at the same ratio and, for NB #0, −71 dBm and −75 dBm are distributed at the same ratio. If the beam change threshold and the beam change count are set to 1 dB and 1, respectively, the probability of changing to NB #0 is 25%, so that the beam change may occur frequently. For example, since the probability that the NB #2 measurement signal strength is less than −71 dBm is 0.5, and the probability that the NB #0 measurement signal strength is −71 dBm is 0.5, the product of the two values may be 0.25. Accordingly, the beam change threshold and the beam change count may be adjusted to make the beam change probability a specific value or less. For example, to make the beam change probability 0%, the beam change threshold may be adjusted to 3 dB and, if the beam change count is adjusted to 2, the beam change probability may be made 10% or less.

Although the above-described embodiments have been described in relation to downlink, the embodiments may also be applied to uplink in the same or a similar manner.

According to an embodiment of the disclosure, an electronic device 101 may comprise an antenna module, a memory, and a processor controlling to identify a first beam set among a plurality of beam sets stored in the memory, perform beamforming based on the identified first beam set through the antenna module, determine whether a beam pattern is changed at least partially based on a prediction value of a reception signal strength set corresponding to the first beam set and a measurement value of a signal received through the antenna module, and change a setting related to a reception beam if the beam pattern is determined to be changed.

The processor may control to identify whether an update condition of the setting related to the reception beam is met if the beam pattern is determined to be changed and, if it is identified that the update condition is met, change the state related to the reception beam.

Whether the update condition is met may be determined based on a distribution of a reception signal strength corresponding to each of a plurality of beam sets.

Changing the setting related to the reception beam may include a change from a first beam set to a second beam set.

Changing the setting related to the reception beam may include adjusting a setting related to changing a reception beam.

The setting related to changing the reception beam may include at least one of the number of beams used, the number of antenna modules, a hierarchical structure of a beam, a beam change threshold, a beam change count, a monitoring threshold of the antenna module, a change threshold of the antenna module, a change count of the antenna module, or a context change threshold.

The hierarchical structure of the beam may include a hierarchical structure between a plurality of wide beams and a plurality of narrow beams.

The setting related to changing the reception beam may include excluding, from beams to be used, a reception beam, which is selected as an optimal reception beam in a ratio less than a set value.

The setting related to changing the reception beam may include setting to reduce a frequency of reception signal strength measurement to search for an optimal reception beam for a reception beam, which is selected as the optimal reception beam in a ratio less than a set value.

The setting related to changing the reception beam may include adjusting a beam change threshold or a beam change count so that a beam change probability becomes a set value or less.

According to an embodiment of the disclosure, a method for setting a reception beam by an electronic device may comprise identifying a first beam set among a plurality of beam sets stored in a memory, performing beamforming based on the identified first beam set through the antenna module, determining whether a beam pattern is changed, at least partially based on a prediction value of a reception signal strength set corresponding to the first beam set and a measurement value of a signal received through the antenna module, and changing a setting related to a reception beam if the beam pattern is determined to be changed.

The method may comprise identifying whether an update condition of the setting related to the reception beam is met if the beam pattern is determined to be changed and, if it is identified that the update condition is met, changing the state related to the reception beam.

The setting related to changing the reception beam may include at least one of the number of beams used, the number of antenna modules, a hierarchical structure of a beam, a beam change threshold, a beam change count, a monitoring threshold of the antenna module, a change threshold of the antenna module, a change count of the antenna module, or a context change threshold.

The setting related to changing the reception beam may include excluding, from beams to be used, a reception beam, which is selected as an optimal reception beam in a ratio less than a set value.

The setting related to changing the reception beam may include setting to reduce a frequency of reception signal strength measurement to search for an optimal reception beam for a reception beam, which is selected as the optimal reception beam in a ratio less than a set value.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device, comprising:
   an antenna module;
   a memory configured to store:
      a first setting value corresponding to beamforming in a first state related to the electronic device,
      a second setting value corresponding to beamforming in a second state related to the electronic device,
      first beam set information corresponding to the first state, and
      second beam set information corresponding to the second state; and
   a processor configured to:
      perform first beamforming based on the first beam set information, through the antenna module, in the first state,
      identify a change from the first state to the second state, based on a measurement value measured by the performed first beamforming and the second setting value, and
      perform second beamforming based on the second beam set information,
   wherein the first setting value is a value set based on a measurement value measured from a signal received when beamforming is performed based on the first beam set information.

2. The electronic device of claim 1, wherein the first setting value is a value set corresponding to a state in which the electronic device is not placed in a case.

3. The electronic device of claim 1, wherein the second setting value is one of a value set corresponding to at least one of a state in which the electronic device is placed in a case, a state in which the electronic device is gripped in a user's hand, or a state in which an abnormality occurs in an antenna included in the electronic device.

4. The electronic device of claim 1, wherein the second beam set information includes information in which at least part of information for at least one reception beam included in the first beam set information has been changed.

5. The electronic device of claim 1, wherein the processor is further configured to control to change a hierarchical structure between a plurality of reception beams included in the first beam set information.

6. The electronic device of claim 5, wherein the hierarchical structure includes a hierarchical structure between a plurality of wide beams and a plurality of narrow beams.

7. The electronic device of claim 6, wherein the processor is further configured to control to exclude, from the hierarchical structure, a wide beam including a reception beam, which is selected as an optimal reception beam in a ratio less than a set value, among the plurality of wide beams.

8. The electronic device of claim 6, wherein the processor is further configured to control to reduce a frequency of reception signal strength measurement to search for an optimal reception beam for a wide beam including a reception beam, which is selected as the optimal reception beam in a ratio less than a set value, among the plurality of wide beams.

9. The electronic device of claim 1, wherein the processor is further configured to adjust a beam change threshold or a beam change count so that a probability of a change in reception beam becomes a set value or less.

10. A method for setting a reception beam by an electronic device, the method comprising:
    identifying first beam set information corresponding to a first state related to the electronic device among a plurality of beam set information stored in a memory;
    performing first beamforming based on the identified first beam set information, through an antenna module, in the first state;
    identifying a change from the first state to a second state, based on a measurement value measured by the performed first beamforming and a setting value set for second beam set information corresponding to the second state related to the electronic device among the plurality of beam set information stored in the memory;
    performing second beamforming based on the second beam set information;
    in response to a change in a beam pattern, identifying whether an update condition of a setting related to the reception beam is met; and
    in response to the update condition being met, changing the setting related to the reception beam.

11. The method of claim 10, wherein whether the update condition is met is determined based on a distribution of a reception signal strength corresponding to each of a plurality of beam sets.

12. The method of claim 10, wherein the change of the setting related to the reception beam includes a change from a first beam set to a second beam set.

13. The method of claim 10, wherein the changing of the setting related to the reception beam includes adjusting a setting related to changing a reception beam.

14. The method of claim 13, wherein the setting related to changing the reception beam includes at least one of the number of beams used, the number of antenna modules, a hierarchical structure of a beam, a beam change threshold, a beam change count, a monitoring threshold of the antenna module, a change threshold of the antenna module, a change count of the antenna module, or a context change threshold.

15. The method of claim 10, wherein the setting related to changing the reception beam includes a setting to reduce a frequency of reception signal strength measurement to search for an optimal reception beam for a reception beam, which is selected as the optimal reception beam in a ratio less than a set value.

16. The method of claim 10, wherein the setting related to changing the reception beam may include a setting to exclude, from beams to be used, a reception beam, which is selected as an optimal reception beam in a ratio less than a set value.

* * * * *